US009761321B2

(12) United States Patent
Lee

(10) Patent No.: US 9,761,321 B2
(45) Date of Patent: *Sep. 12, 2017

(54) STORAGE DEVICE AND OPERATING METHOD OF STORAGE DEVICE

(71) Applicant: SAMSUNG ELECTRONICS CO., LTD., Suwon-si, Gyeonggi-Do (KR)

(72) Inventor: Ju Seok Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,867

(22) Filed: Aug. 11, 2016

(65) Prior Publication Data
US 2016/0351271 A1 Dec. 1, 2016

Related U.S. Application Data

(63) Continuation of application No. 14/856,695, filed on Sep. 17, 2015, now Pat. No. 9,431,122.

(30) Foreign Application Priority Data

Sep. 26, 2014 (KR) ........................ 10-2014-0129385

(51) Int. Cl.
G11C 16/04 (2006.01)
G11C 16/34 (2006.01)
G11C 16/26 (2006.01)
G11C 11/56 (2006.01)
G11C 16/08 (2006.01)
G11C 16/10 (2006.01)
G11C 16/16 (2006.01)

(52) U.S. Cl.
CPC ...... *G11C 16/3445* (2013.01); *G11C 11/5642* (2013.01); *G11C 16/0483* (2013.01); *G11C 16/08* (2013.01); *G11C 16/10* (2013.01); *G11C 16/16* (2013.01); *G11C 16/26* (2013.01); *G11C 16/3422* (2013.01)

(58) Field of Classification Search
CPC . G11C 16/0483; G11C 16/10; G11C 16/3459; G11C 16/16; G11C 11/5642; G11C 16/3445; G11C 16/08; G11C 16/26; G11C 16/14; G11C 16/3422; G11C 16/34
USPC ..... 365/185.11, 185.12, 185.21, 185.22, 236
See application file for complete search history.

(56) References Cited

U.S. PATENT DOCUMENTS

| 5,896,318 | A  | 4/1999  | Asada et al.   |
| 5,963,473 | A  | 10/1999 | Norman         |
| 7,012,835 | B2 | 3/2006  | Gonzalez et al.|
| 7,397,697 | B2 | 7/2008  | So et al.      |

(Continued)

Primary Examiner — David Lam
(74) Attorney, Agent, or Firm — Volentine & Whitt, PLLC

(57) ABSTRACT

An operating method is provided which includes receiving a read command and a read address, performing a read operation about memory cells selected according to the read address, and performing a reliability verification read operation about unselected memory cells adjacent to the selected memory cells. A number of memory cells each corresponding to at least one state of an erase state and program states of the unselected memory cells is counted as a count value based on the result of the reliability verification read operation. Data read through the read operation is output to an external device and data read through the reliability verification read operation is not output to the external device.

20 Claims, 19 Drawing Sheets

(56) References Cited

U.S. PATENT DOCUMENTS

| | | |
|---|---|---|
| 7,551,503 B2 | 6/2009 | Ho |
| 7,679,133 B2 | 3/2010 | Son et al. |
| 7,738,293 B2 | 6/2010 | Cho et al. |
| 7,808,831 B2 | 10/2010 | Mokhlesi et al. |
| 7,859,932 B2 | 12/2010 | Mokhlesi |
| 7,961,516 B2 | 6/2011 | Isobe |
| 8,189,401 B2 | 5/2012 | Fukuda |
| 8,316,278 B2 | 11/2012 | Ahn et al. |
| 8,553,466 B2 | 10/2013 | Han et al. |
| 8,559,224 B2 | 10/2013 | Han et al. |
| 8,559,235 B2 | 10/2013 | Yoon et al. |
| 8,654,587 B2 | 2/2014 | Yoon et al. |
| 8,908,430 B2 | 12/2014 | Yoo |
| 9,305,643 B2 * | 4/2016 | Gopinath ............. G11C 13/004 |
| 9,431,122 B2 * | 8/2016 | Lee ........................ G11C 16/26 |
| 9,502,128 B2 * | 11/2016 | Lee ........................ G11C 16/34 |
| 2010/0235713 A1 | 9/2010 | Lee et al. |
| 2011/0233648 A1 | 9/2011 | Seol et al. |
| 2012/0294092 A1 | 11/2012 | Cho et al. |

\* cited by examiner

FIG. 12

| Candidate page for reference page | First page (R1) corresponding to upper WL and selected SSL |
| --- | --- |
| | Second page (R2) corresponding to lower WL and selected SSL |
| | Third page (R3) corresponding to selected WL and unselected 1st SSL |
| | Fourth page (R4) corresponding to selected WL and unselected 2nd SSL |
| | Fifth page (R5) corresponding to upper WL and unselected 1st SSL |
| | Sixth page (R6) corresponding to upper WL and unselected 2nd SSL |
| | Seventh page (R7) corresponding to lower WL and unselected 1st SSL |
| | Eighth page (R8) corresponding to lower WL and unselected 2nd SSL |
| | Ninth page (R9) corresponding to predetermined WL and selected SSL |
| | Tenth page (R10) corresponding to predetermined WL and unselected 1st SSL |
| | Eleventh page (R11) corresponding to predetermined WL and unselected 2nd SSL |

FIG. 13

| Number of reference states | | Embodiments for selecting reference state |
|---|---|---|
| 1 | 1st Scheme | Select one page constantly, alternately, randomly, or according to predetermined pattern |
| 2 | 2nd Scheme | Select two pages constantly, alternately, randomly, or according to predetermined pattern |
| 3 | 3rd Scheme | Select three pages constantly, alternately, randomly, or according to predetermined pattern |
| 4 | 4th Scheme | Select four pages constantly, alternately, randomly, or according to predetermined pattern |
| 5 | 5th Scheme | Select five pages constantly, alternately, randomly, or according to predetermined pattern |
| 6 | 6th Scheme | Select six pages constantly, alternately, randomly, or according to predetermined pattern |
| 7 | 7th Scheme | Select seven pages constantly, alternately, randomly, or according to predetermined pattern |
| 8 | 8th Scheme | Select eight pages constantly, alternately, randomly, or according to predetermined pattern |
| 9 | 9th Scheme | Select nine pages constantly, alternately, randomly, or according to predetermined pattern |
| 10 | 10th Scheme | Select ten pages constantly, alternately, randomly, or according to predetermined pattern |
| 11 | 11th Scheme | Select R1~R11 |

FIG. 17

| Status of NVM | Variation of reliability verification read |
|---|---|
| P/E cycle increases | Decreases range or average of RDN, or Perform reliability verification read on at least one more reference state, reference page or reference page |
| Read cycle after program increases | |
| Elapsed time after program increases | |
| Elapsed time after program is shorter than reference time | Skip reliability verification read |
| Random data | Perform reliability verification read on at least one more (or less) reference state, reference page or reference page |
| Information of memory cells having lower reliability exists | Perform reliability verification read on at least one more page among R9 to R11 |

FIG. 18

| | |
|---|---|
| 1st Scheme | Copy data of selected memory cells |
| 2nd Scheme | Copy data of selected memory cells and memory cells of reference page |
| 3rd Scheme | Copy data of memory cells of reference page |
| 4th Scheme | Copy data of group including selected memory cells and memory cells of reference page |
| 5th Scheme | Close group including selected memory cells and memory cells of reference page |

STORAGE DEVICE AND OPERATING METHOD OF STORAGE DEVICE

CROSS-REFERENCE TO RELATED APPLICATIONS

This a Continuation of U.S. application Ser. No. 14/856,695, filed Sep. 17, 2015, which issued as U.S. Pat. No. 9,431,122 on Aug. 30, 2016, and in which a claim for priority under 35 U.S.C. §119 is made to Korean Patent Application No. 10-2014-0129385 filed Sep. 26, 2014, in the Korean Intellectual Property Office, the entire contents of which are hereby incorporated by reference.

FIELD

The inventive concepts described herein relate to a semiconductor memory, and more particularly, relate to a storage device and an operating method thereof.

BACKGROUND

A storage device is a device that stores data according to a control of a host device, such as a computer, a smart phone, and a smart pad. A storage device may contain a device (e.g., Hard Disk Drive), which stores data on a magnetic disk, or a semiconductor memory, such as Solid State Drive or memory card, in particular, a device which stores data on a nonvolatile memory.

A nonvolatile memory may be ROM (Read Only Memory), PROM (Programmable ROM), EPROM (Electrically Programmable ROM), EEPROM (Electrically Erasable and Programmable ROM), flash memory, PRAM (Phase-change RAM), MRAM (Magnetic RAM), RRAM (Resistive RAM), or FRAM (Ferroelectric RAM).

With the advancement of the semiconductor fabrication technology, the degree of integration and capacity of storage devices continues to increase. The high integration of storage devices has reduced the production cost of storage devices. However, various problems that are not conventionally noticed are detected now as storage devices are scaled down due to the high integration of storage devices, thereby causing damage to data stored at a storage device. Thus, the reliability of storage devices may decrease.

SUMMARY

One aspect of embodiments of the inventive concept is directed to providing an operating method of a storage device which includes a nonvolatile memory and a memory controller configured to control the nonvolatile memory. The operating method includes: receiving a read command and a read address; performing a read operation about memory cells, selected by the read address, according to the read command; performing a reliability verification read operation about unselected memory cells different from the selected memory cells; and calculating a difference between a count value, generated according to a result of the reliability verification read operation, and a reference count value. A number of memory cells each corresponding to at least one state of an erase state and program states of the unselected memory cells is counted as the count value based on the result of the reliability verification read operation. Data read through the read operation is output to an external device and data read through the reliability verification read operation is not output to the external device.

The number of memory cells corresponding to the erase state or a program state, corresponding to a highest threshold voltage distribution range, from among the program state may be counted at the reliability verification read operation.

The reliability verification read operation may be determined as being failed, when the difference is greater than or equal to a threshold or critical value.

The reference count value may indicate a number of memory cells, programmed to the at least one state, from among the unselected memory cells upon programming the unselected memory cells.

The operating method may further include performing a read reclaim operation when the reliability verification read operation is determined as being failed.

The operating method may further include performing a second reliability verification read operation about at least one page data of a plurality of page data, stored at unselected second memory cells adjacent to the selected memory cells, when the reliability verification read operation is determined as being failed.

The performing of a second reliability verification read operation may include reading the at least one page data, and performing a read reclaim operation when a bit error ratio of the at least one page data is greater than or equal to a second threshold or critical value.

The nonvolatile memory may include a plurality of cell strings arranged on a substrate in rows and columns, each cell string having a ground selection transistor, a plurality of memory cells, and a string selection transistor sequentially stacked on the substrate in a direction perpendicular to the substrate. String selection transistors of cell strings in first through M-th rows may be respectively connected to first through M-th string selection lines. Memory cells belonging to cell strings of the first through M-th rows and having first through N-th heights may be respectively connected to first through N-th word lines. The selected memory cells may belong to a selected page corresponding to a word line and a string selection line that are selected according to the read address.

The reliability verification read operation may be performed with respect to unselected memory cells that belong to an unselected first page corresponding to an upper word line, adjacent to the selected word line, and the selected string selection line or to an unselected second page corresponding to a lower word line, adjacent to the selected word line, and the selected string selection line.

The reliability verification read operation may be performed with respect to unselected memory cells that belong to an unselected first page corresponding to an upper word line, adjacent to the selected word line, and an unselected string selection line, to an unselected second page corresponding to a lower word line, adjacent to the selected word line, and to the unselected string selection line, or an unselected third page corresponding to the selected word line and the unselected string selection line.

The reliability verification read operation may be performed with respect to unselected memory cells that belong to a first page corresponding to the selected word line and a predetermined word line or to a second page corresponding to an unselected string selection line and the predetermined word line.

The reliability verification read operation may be performed when a count that is increased when the read operation is executed reaches a random number, and the random number may be updated when the reliability verification read operation is executed.

The operating method may further include: collecting a plurality of page data to be programmed at the unselected memory cells; counting a number memory cells to be programmed to the at least one state, based on the plurality of page data collected; programming the plurality of page data collected at the unselected memory cells; and programming the counted value as the reference count value at a spare area associated with the unselected memory cells.

The calculating of a difference between a count value and a reference count value may include: counting the number of memory cells, corresponding to the at least one state, from among the result of the reliability verification read operation; reading the reference count value from the spare area; and calculating a difference between the count value and the reference count value.

Another aspect of embodiments of the inventive concept is directed to providing a storage device which includes a nonvolatile memory and a memory controller. The nonvolatile memory includes a plurality of cell strings arranged on a substrate in rows and columns. The memory controller controls the nonvolatile memory. Each cell string includes a ground selection transistor, a plurality of memory cells, and a string selection transistor sequentially stacked on the substrate in a direction perpendicular to the substrate. The memory controller is configured to read data from selected memory cells of the nonvolatile memory in response to a request of an external device, count a number of memory cells corresponding to at least one state of an erase state and program states of unselected memory cells adjacent to the selected memory cells, and perform a read reclaim operation about the unselected memory cells depending on a result of the counting.

BRIEF DESCRIPTION OF THE FIGURES

The above and other objects and features will become apparent from the following description with reference to the following figures, wherein like reference numerals refer to like parts throughout the various figures unless otherwise specified, and wherein

FIGS. 12 and 13 are tables showing various embodiments for selecting a reference row;

FIG. 17 is a table showing an embodiment where a reliability verification read condition is adjusted;

FIG. 18 is a table showing embodiments of a read reclaim operation that a storage device according to an embodiment of the inventive concept performs.

DETAILED DESCRIPTION

Figure 1:
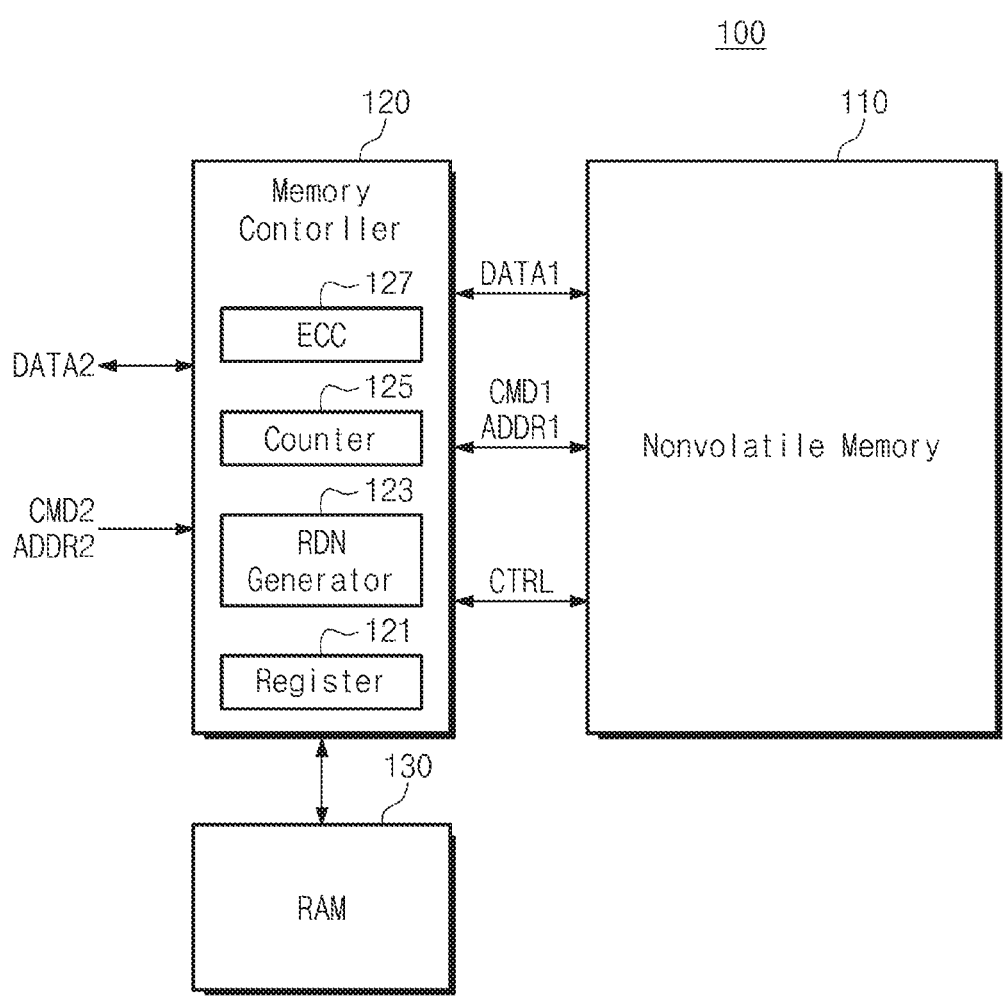
FIG. 1 is a block diagram schematically illustrating a storage device according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a storage device 100 according to an embodiment of the inventive concept. Referring to FIG. 1, a storage device 100 includes a nonvolatile memory 110, a memory controller 120, and a RAM 130.

The nonvolatile memory 110 performs read, write, and erase operations according to control of the memory controller 120. The nonvolatile memory 110 exchanges first data DATA1 with the memory controller 120. For example, the nonvolatile memory 110 receives write data from the memory controller 120 and stores the write data. The nonvolatile memory 110 performs a read operation and outputs the read first data to the memory controller 120.

The nonvolatile memory 110 receives a first command CMD1 and a first address ADDR1 from the memory controller 120. The nonvolatile memory 110 exchanges a control signal CTRL with the memory controller 120. For example, the nonvolatile memory 110 receives, from the memory controller 120, at least one of a chip enable signal/CE for selecting at least one of a plurality of semiconductor devices constituting the nonvolatile memory 110, a command latch enable signal CLE indicating that a signal received from the memory controller 120 is the first command CMD1, an address latch enable signal ALE indicating that a signal received from the memory controller 120 is the first address ADDR1, a read enable signal/RE received from the memory controller 120 at a read operation, periodically toggled, and used to tune timing, a write enable signal/WE activated by the memory controller 120 when the first command CMD1 or the first address ADDR1 is transmitted, a write protection signal/WP activated by the memory controller 120 to prevent unintended writing or erasing during a power fluctuation, and a data strobe signal DQS used to adjust input synchronization about the first data DATA1 and generated from the memory controller 120 at a write operation so as to be periodically toggled. For example, the nonvolatile memory 110 outputs, to the memory controller 120, at least one of a ready/busy signal R/nB indicating whether the nonvolatile memory 110 is performing a program, erase or read operation and a data strobe signal DQS used to adjust output synchronization about the first data DATA1 and generated from the read enable signal/RE by the nonvolatile memory 110 so as to be periodically toggled.

The nonvolatile memory 110 may include a flash memory. However, the inventive concept is not limited thereto. For example, the nonvolatile memory 110 may incorporate at least one of nonvolatile memories such as PRAM (Phase-change RAM), MRAM (Magnetic RAM), RRAM (Resistive RAM), FeRAM (Ferroelectric RAM), and so on.

The memory controller 120 is configured to control the nonvolatile memory 110. For example, the nonvolatile memory 110 performs a write, read, or erase operation according to control of the memory controller 120. The memory controller 120 exchanges the first data DATA1 and the control signal CTRL with the nonvolatile memory 110 and outputs the first command CMD1 and the first address ADDR1 to the nonvolatile memory 110.

The memory controller 120 controls the nonvolatile memory 110 according to control of an external host device (not shown). The memory controller 120 exchanges second data DATA2 with the host device and receives a second command CMD2 and a second address ADDR2 therefrom.

In exemplary embodiments, the memory controller 120 exchanges the first data DATA1 with the nonvolatile memory 110 by a first unit (e.g., time unit or data unit), and it exchanges the second data DATA2 with the host device by a second unit (e.g., time unit or data unit) different from the first unit.

Based on a first format, the memory controller 120 exchanges the first data DATA1 with the nonvolatile memory 110 and transmits the first command CMD1 and the first address ADDR1 to the nonvolatile memory 110. Based on a second format different from the first format, the memory controller 120 exchanges the second data DATA2 with the host device and receives the second command CMD2 and the second address ADDR2 from the host device.

The memory controller 120 uses the RAM 130 as a working memory, a buffer memory, or a cache memory. For example, the memory controller 120 receives the second data DATA2 from the host device and stores the second data DATA2 in the RAM 130. The memory controller 120 writes the second data DATA2 stored in the RAM 130 at the nonvolatile memory 110 as the first data DATA1. The memory controller 120 reads the first data DATA1 from the nonvolatile memory 110 and stores the first data DATA1 thus read in the RAM 130. The memory controller 120 outputs the first data DATA1 stored in the RAM 130 to the host device as the second data DATA2. The memory controller 120 stores data read from the nonvolatile memory 110 at the RAM 130 and writes the data stored in the RAM 130 back at the nonvolatile memory 110.

The memory controller 120 stores data or codes, needed to manage the nonvolatile memory 110, at the RAM 130. For example, the memory controller 120 reads data or codes, needed to manage the nonvolatile memory 110, from the nonvolatile memory 110 and loads the read data or codes on the RAM 130 for driving.

The memory controller 120 includes a register 121, a random number generator 123, a counter 125, and an error correction block 127.

The register 121 stores information about a condition where the random number generator 123 generates a random number RDN. For example, the register 121 may store information about a range of the random number RDN or information about an average value of the random number RDN. The register 121 stores information about a condition for generating two or more random numbers RDN.

The random number generator 123 generates the random number RDN, based on the condition stored at the register 121. The random number generator 123 may generate two or more random numbers RDN.

The counter 125 counts the number of read operations that the nonvolatile memory 110 performs. For example, the counter 125 may count the number of read operations that are performed at an erase unit such as a memory block or a sub block of the nonvolatile memory 110. The counter 125 resets its count when the count reaches the random number RDN that the random number generator 123 generates. When the count reaches the random number RDN that the random number generator 123 generates, the random number generator 123 updates (e.g., newly generates) the random number RDN, based on the condition stored at the register 121.

The error correction block 127 corrects an error of first data DATA1 read from the nonvolatile memory 110. For example, when the first data DATA1 is written at the nonvolatile memory 110, the error correction block 127 generates parity with use of the first data DATA1. The parity is written at the nonvolatile memory 110 together with the first data DATA1. When the first data DATA1 is read from the nonvolatile memory 110, the parity is read together with the first data DATA1. The error correction block 127 corrects an error of the first data DATA1 thus read, based on the read parity. The error correction block 127 calculates a bit error rate (BER) of the first data DATA1 thus read.

The memory controller 120 receives a read command as a second command CMD2. The memory controller 120 performs a read operation about selected memory cells of the nonvolatile memory 110 in response to the second command CMD2 received. When the count of the counter 125 reaches the random number RDN, the memory controller 120 performs a reliability verification read operation about peripheral memory cells that are adjacent to memory cells experiencing the read operation. For example, the reliability verification read operation may include a read operation about at least one of the states that the peripheral memory cells of the nonvolatile memory 110 have. When a bit error rate of first data DATA1 read through the reliability verification read operation is over a threshold value, the memory controller 120 performs a read reclaim about an erase unit such as a memory block or an erase block to which the peripheral memory cells belong. The reliability verification read operation and following operations associated with the reliability verification read operation will be more fully described with reference to accompanying drawings.

The RAM 130 may include at least one of a variety of random access memories, such as, but not limited to, a static RAM, a dynamic RAM, a synchronous DRAM (SRAM), a Phase-change RAM (PRAM), a Magnetic RAM (MRAM), a Resistive RAM (RRAM), a Ferroelectric RAM (FRAM), and so on.

The storage device 100 perform address mapping to reduce overhead due to an erase operation of the nonvolatile memory 110. For example, when overwriting is requested from an external host device, the storage device 100 erases memory cells at which odd data is stored and stores overwrite-requested data at memory cells of a free storage space, not the erased memory cells. The memory controller 120 drives a flash translation layer (FTL) that maps a logical address for the external host device and a physical address for the nonvolatile memory 110 depending on the above-described method. For example, the second address ADDR2 is a logical address, and the first address ADDR1 is a physical address.

The storage device 100 performs an operation of writing, reading or erasing data according to a request of the host device. The storage device 100 may include a solid state drive (SSD) or a hard disk drive (HDD). The storage device 100 may include memory cards, such as a PC card (PCM-CIA, personal computer memory card international association), compact flash card, smart media card (SM, SMC), memory stick, multimedia card (MMC, RS-MMC, MMC-micro), SD card (SD, miniSD, microSD, SDHC), USB (Universal Serial Bus) memory card, universal flash storage (UFS), and so on. The storage device 100 may include embedded memories, such as an eMMC (embedded Multi-Media Card), UFS, PPN (Perfect Page New), and so on.

Figure 2:
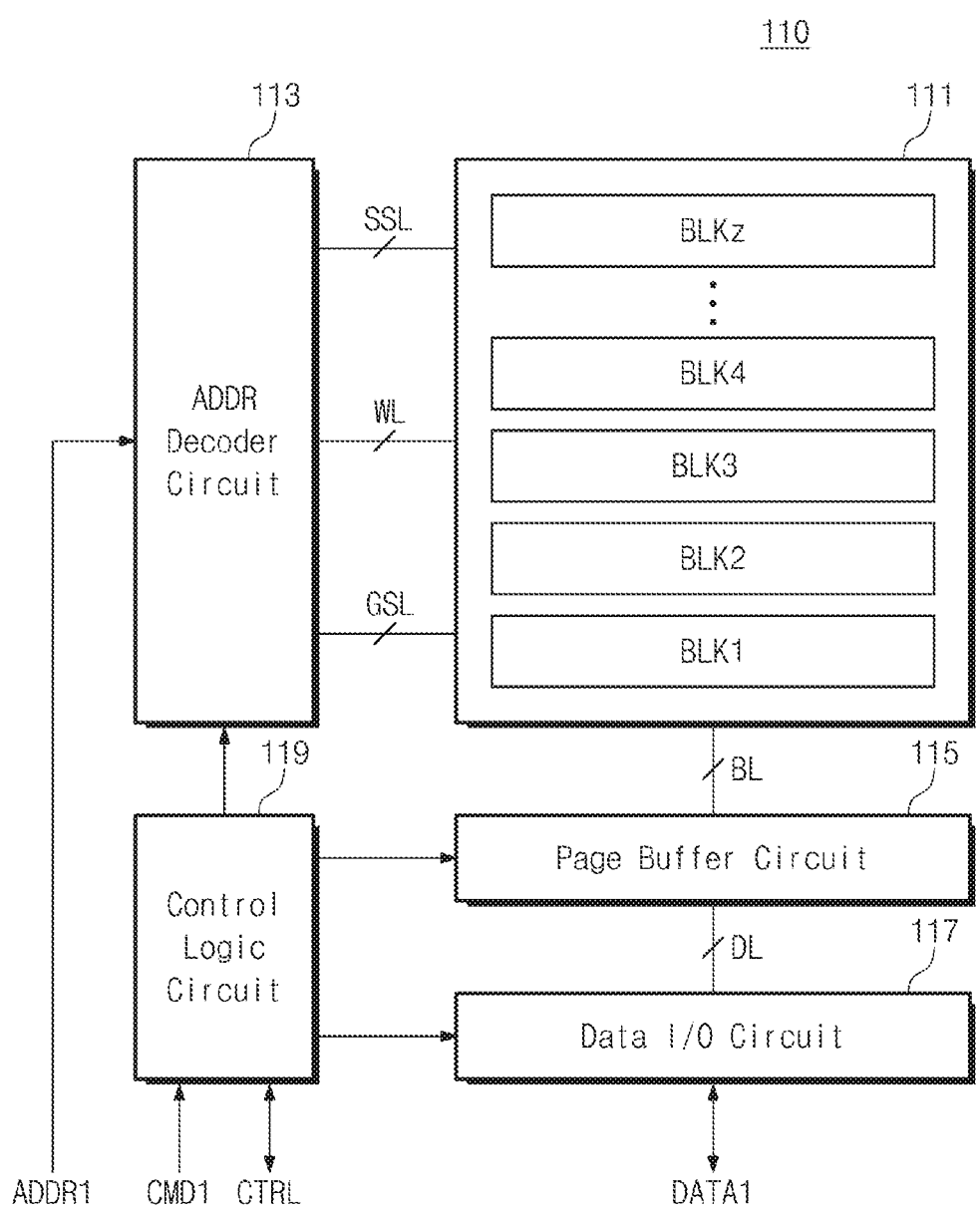
FIG. 2 is a block diagram schematically illustrating a nonvolatile memory according to an embodiment of the inventive concept.

FIG. 2 is a block diagram schematically illustrating a nonvolatile memory 110 according to an embodiment of the inventive concept. Referring to FIG. 2, a nonvolatile memory 110 includes a memory cell array 111, an address decoder circuit 113, a page buffer circuit 115, a data input/output circuit 117, and a control logic circuit 119.

The memory cell array 111 includes a plurality of memory blocks BLK1 through BLKz, each of which has a plurality of memory cells. Each memory block is connected to the address decoder circuit 113 through at least one string selection line SSL, a plurality of word lines WL, and at least one ground selection line GSL. Each memory block is connected to the page buffer circuit 115 through a plurality of bit lines BL. The memory blocks BLK1 through BLKz may be connected in common to the plurality of bit lines BL. Memory cells of the memory blocks BLK1 through BLKz may have the same structure. In exemplary embodiments, each of the memory blocks BLK1 through BLKz may be a unit of an erase operation. An erase operation may be carried out by the memory block. Memory cells of a memory block may be erased at the same time. Each sub block may be a unit of an erase operation.

The address decoder circuit 113 is connected to the memory cell array 111 through a plurality of ground selection lines GSL, the plurality of word lines WL, and a plurality of string selection lines SSL. The address decoder circuit 113 operates in response to a control of the control logic circuit 119. The address decoder circuit 113 receives a first address ADDR1 from a memory controller 120. The address decoder circuit 113 decodes the first address ADDR1 and controls voltages to be applied to the word lines WL depending on the decoded address.

For example, at programming, the address decoder circuit 113 applies a program voltage to a selected word line of a selected memory block that the first address ADDR1 points out. The address decoder circuit 113 also applies a pass voltage to unselected word lines of the selected memory block. At reading, the address decoder circuit 113 applies a selection read voltage to a selected word line of a selected memory block that the first address ADDR1 points out. The address decoder circuit 113 also applies a non-selection read voltage to unselected word lines of the selected memory block. At erasing, the address decoder circuit 113 applies an erase voltage (e.g., ground voltage) to word lines of a selected memory block that the first address ADDR1 points out.

The page buffer circuit 115 is connected to the memory cell array 111 through the bit lines BL. The page buffer circuit 115 is connected to the data input/output circuit 117 through a plurality of data lines DL. The page buffer circuit 115 operates in response to control of the control logic circuit 119.

The page buffer circuit 115 holds data to be programmed at memory cells of the memory cell array 111 or data read from memory cells thereof. During a program operation, the page buffer circuit 115 stores data to be stored in memory cells. The page buffer circuit 115 biases the plurality of bit lines BL based on the stored data. The page buffer circuit 115 functions as a write driver at a program operation. During a read operation, the page buffer circuit 115 senses voltages of the bit lines BL and stores the sensed results. The page buffer circuit 115 functions as a sense amplifier at a read operation.

The data input/output circuit 117 is connected to the page buffer circuit 115 through the data lines DL. The data input/output circuit 117 exchanges first data DATA1 with the memory controller 120.

The data input/output circuit 117 temporarily stores first data DATA1 the memory controller 120 provides, and it transfers the temporarily stored data to the page buffer circuit 115. The data input/output circuit 117 temporarily stores data transferred from the page buffer circuit 115 and transfers it to the memory controller 120. The data input/output circuit 117 functions as a buffer memory.

The control logic circuit 119 receives a first command CMD1 and a control signal CTRL from the memory controller 120. The control logic circuit 119 decodes the first command CMD1 thus received and controls an overall operation of the nonvolatile memory 110 according to the decoded command.

Upon writing, the control logic circuit 119 may generate a data strobe signal DQS depending on a read enable signal/RE of the received control signal CTRL.

Figure 3:
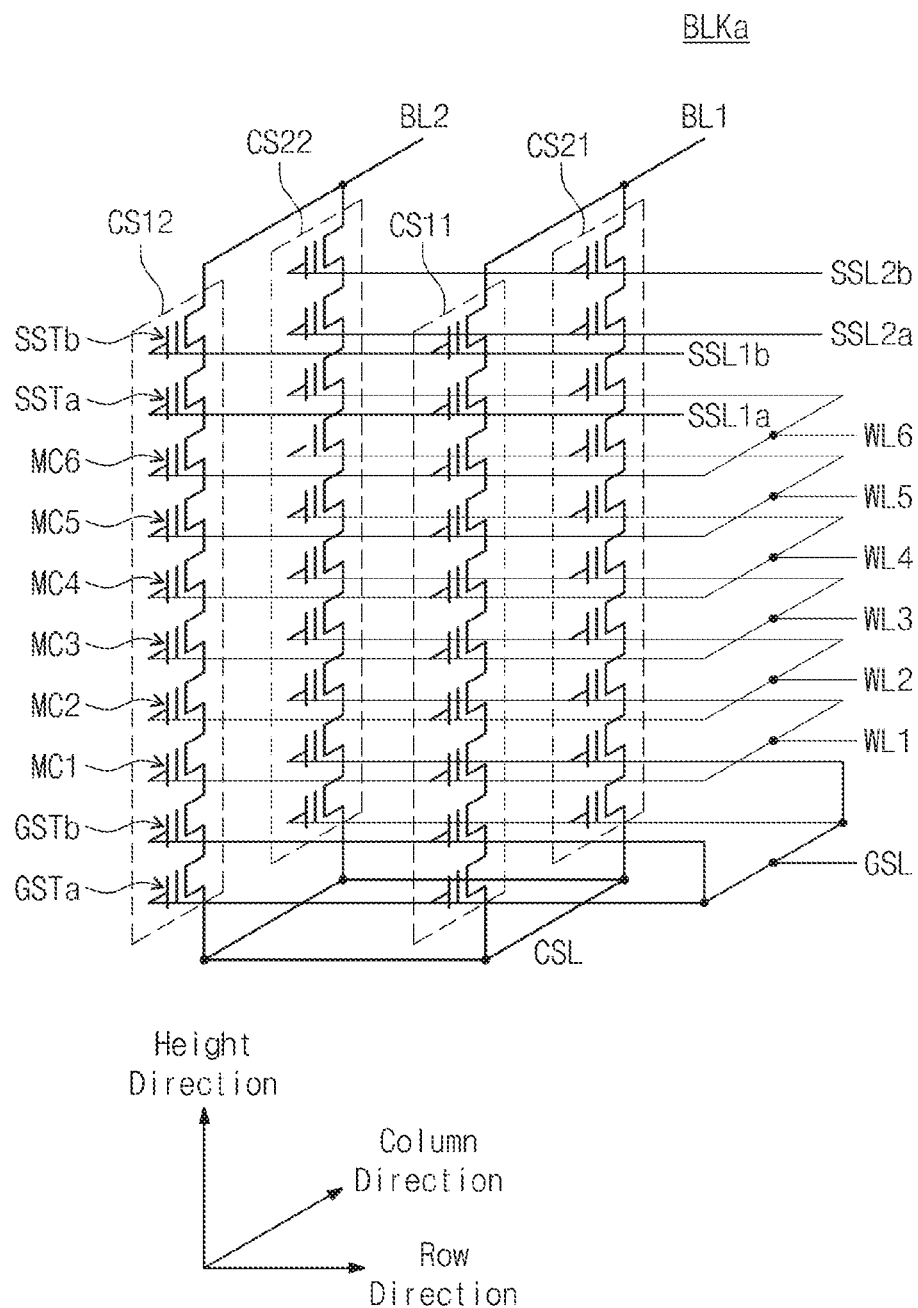
FIG. 3 is a circuit diagram schematically illustrating a memory block according to an embodiment of the inventive concept.

FIG. 3 is a circuit diagram schematically illustrating a memory block BLKa according to an embodiment of the inventive concept. Referring to FIG. 3, a memory block BLKa includes a plurality of cell strings CS11 through CS21 and CS12 through CS22. The plurality of cell strings CS11 through CS21 and CS12 through CS22 are arranged along a row direction and a column direction and form rows and columns.

For example, the cell strings CS11 and CS12 arranged along the row direction form a first row, and the cell strings CS21 and CS22 arranged along the row direction form a second row. The cell strings CS11 and CS21 arranged along the column direction form a first column, and the cell strings CS12 and CS22 arranged along the column direction form a second column.

Each cell string contains a plurality of cell transistors. The cell transistors include ground selection transistors GSTa and GSTb, memory cells MC1 through MC6, and string selection transistors SSTa and SSTb. The ground selection transistors GSTa and GSTb, memory cells MC1 through MC6, and string selection transistors SSTa and SSTb of each cell string are stacked in a height direction perpendicular to a plane (e.g., plane above a substrate of the memory block BLKa) on which the cell strings CS11 through CS21 and CS12 through CS22 are arranged along rows and columns.

Each cell transistor may be formed of a charge trap type cell transistor of which the threshold voltage varies with the amount of charge trapped in its insulation layer.

Lowermost ground selection transistors GSTa are connected in common to a common source line CSL.

The ground selection transistors GSTa and GSTb of the plurality of cell strings CS11 through CS21 and CS12 through CS22 are connected in common to a ground selection line GSL.

In exemplary embodiments, ground selection transistors with the same height (or, order) may be connected to the same ground selection line, and ground selection transistors with different heights (or, orders) may be connected to different ground selection lines. For example, the ground selection transistors GSTa with a first height are connected in common to a first ground selection line, and the ground selection transistors GSTb with a second height are connected in common to a second ground selection line.

In exemplary embodiments, ground selection transistors in the same row may be connected to the same ground selection line, and ground selection transistors in different rows may be connected to different ground selection lines. For example, the ground selection transistors GSTa and GSTb of the cell strings CS11 and CS12 in the first row are connected in common to the first ground selection line and the ground selection transistors GSTa and GSTb of the cell strings CS21 and CS22 in the second row are connected in common to the second ground selection line.

Connected in common to a word line are memory cells that are placed at the same height (or, order) from the substrate (or, the ground selection transistors GST). Connected to different word lines WL1 through WL6 are memory cells that are placed at different heights (or, orders). For example, the memory cells MC1 are connected in common to the word line WL1, the memory cells MC2 are connected in common to the word line WL2, and the memory cells MC3 are connected in common to the word line WL3. The memory cells MC4 are connected in common to the word line WL4, the memory cells MC5 are connected in common to the word line WL5, and the memory cells MC6 are connected in common to the word line WL6.

In first string selection transistors SSTa, having the same height (or, order), of the cell strings CS11 through CS21 and CS12 through CS22, the first string selection transistors SSTa in different rows are connected to different string selection lines SSL1*a* and SSL2*a*. For example, the first string selection transistors SSTa of the cell strings CS11 and CS12 are connected in common to the string selection line SSL1*a*, and the first string selection transistors SSTa of the cell strings CS21 and CS22 are connected in common to the string selection line SSL2*a*.

In second string selection transistors SSTb, having the same height (or, order), of the cell strings CS11 through CS21 and CS12 through CS22, the second string selection transistors SSTb in different rows are connected to the different string selection lines SSL1*a* and SSL2*a*. For example, the second string selection transistors SSTb of the cell strings CS11 and CS12 are connected in common to the string selection line SSL1*b*, and the second string selection transistors SSTb of the cell strings CS21 and CS22 are connected in common to the string selection line SSL2*b*.

That is, cell strings in different rows may be connected to different string selection lines. String selection transistors, having the same height (or, order), of cell strings in the same row may be connected to the same string selection line. String selection transistors, having different heights (or, orders), of cell strings in the same row may be connected to different string selection lines.

In exemplary embodiments, string selection transistors of cell strings in the same row may be connected in common to a string selection line. For example, string selection transistors SSTa and SSTb of cell strings CS11 and CS12 in the first row are connected in common to a string selection line, and string selection transistors SSTa and SSTb of cell strings CS21 and CS22 in the second row are connected in common to a string selection line.

Columns of the cell strings CS11 through CS21 and CS12 through CS22 are connected to different bit lines BL1 and BL2, respectively. For example, string selection transistors SSTb of the cell strings CS11 and CS21 in the first column are connected in common to the bit line BL1, and string selection transistors SSTb of the cell strings CS12 and CS22 in the second column are connected in common to the bit line BL2. The cell strings CS11 and CS12 form a first plane, and the cell strings CS21 and CS22 form a second plane.

A write and a read operation of the memory block BLKa may be performed by a page. The page may be defined by a plane and a height. For example, one plane is selected by the string selection lines SSL1a, SSL1b, SSL2a, and SSL2b. Connected to the bit lines BL1 and BL2 are cell strings CS11 and CS12 of the first plane when a turn-on voltage is applied to the string selection lines SSL1a and SSL1b and a turn-off voltage is supplied to the string selection lines SSL2a and SSL2b. That is, the first plane is selected. Connected to the bit lines BL1 and BL2 are cell strings CS21 and CS22 of the second plane when a turn-on voltage is applied to the string selection lines SSL2a and SSL2b and a turn-off voltage is supplied to the string selection lines SSL1a and SSL1b. That is, the second plane is selected. In a selected plane, a page of memory cells, which belong to the same height, may be selected by word lines WL1 to WL6. A read or a write operation may be performed with respect to the selected page.

Pieces of page data may be written at memory cells in a page of the memory block BLKa. A plurality of bits may be written at each of memory cells of a page. For example, bits that are first written at memory cells of a page form LSB page data, and bits that are lastly written at memory cells of a page form MSB page data. In the memory cells of the page, bits that are written between the LSB page data and the MSB page data form central significant bit (CSB) page data. In each of the memory cells of the page, CSB page data may include two or more bits. The number of bits that are written at one memory cell may be the number of pieces of page data.

An erase operation on the memory block BLKa may be performed by the block or by the sub block. All of memory cells of a memory block BLKa may be erased when the erase operation is performed by the memory block. The erase operation being performed by the sub block, a part of memory cells of the memory block BLKa may be erased and the rest thereof may be erase-inhibited. A low voltage (e.g., ground voltage) is supplied to a word line connected to memory cells to be erased, and a word line connected to memory cells to be erase-inhibited is floated.

The memory block BLKa shown in FIG. 3 is exemplary. However, the scope and spirit of the inventive concept may not be limited thereto. For example, the number of rows of cell strings may increase or decrease. If the number of rows of cell strings is changed, the number of string or ground selection lines and the number of cell strings connected to a bit line may also be changed.

The number of columns of cell strings may increase or decrease. If the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In an embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer. Each vertical NAND string further includes at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

Figure 4:
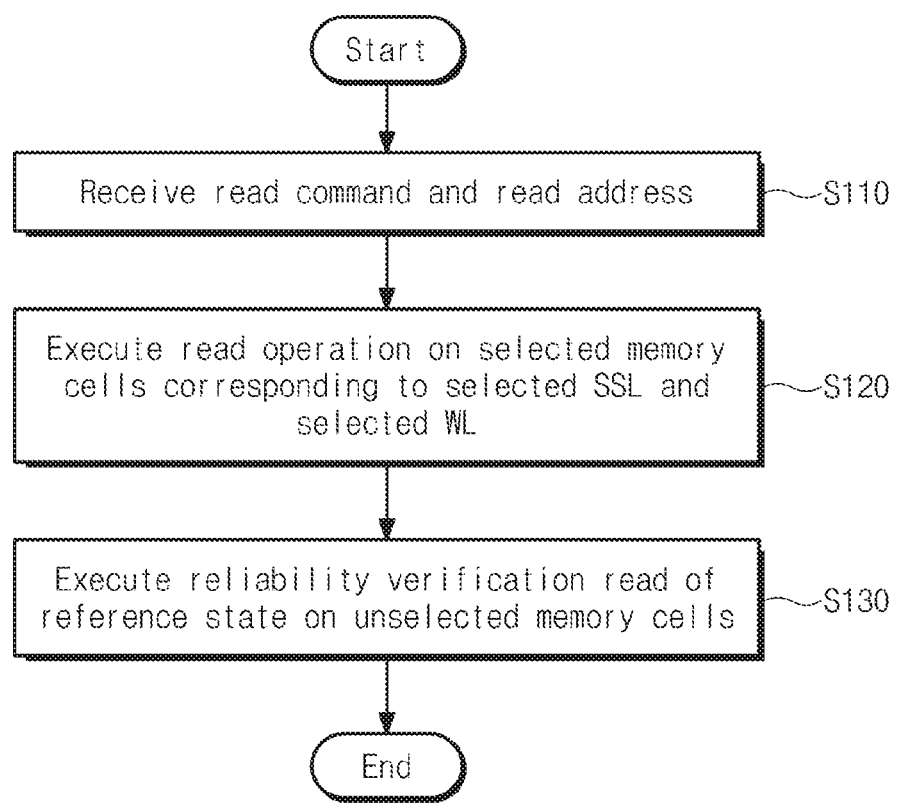
FIG. 4 is a flowchart showing an operating method of a storage device according to an embodiment of the inventive concept.

FIG. 4 is a flowchart showing an operating method of a storage device 100 according to an embodiment of the inventive concept. Referring to FIGS. 1 through 4, in step S110, a read command and a read address are received. For example, the read command may be received as a second command CMD2 from an external host device, and the read address may be received as a second address ADDR2.

In step S120, a read operation is performed with respect to selected memory cells corresponding to a selected string selection line SSL of a selected memory block or a selected sub block. For example, a memory controller 120 selects a memory block or sub block that the read address indicates. The memory controller 120 selects a string selection line SSL and a word line that the read address indicates. The memory controller 120 performs a read operation about selected memory cells corresponding to the selected string selection line SSL and word line WL of the selected memory block or sub block.

In step S130, a reliability verification reading is executed with respect to unselected memory cells. For example, the memory controller 120 executes the reliability verification read operation, based on the read address received in step S110. The memory controller 120 executes the reliability verification reading operation with respect to unselected memory cells in the memory block or sub block that the read address indicates.

The memory controller 120 executes the reliability verification read operation with respect to reference states of memory cells of a reference page. For example, the reference page may be a page that does not correspond to the read address. The reference page may be a page that corresponds to an unselected string selection line. The reference page may be a page that corresponds to a selected string selection line and an unselected word line. The reference states may include at least one of an erase state and at least one program state that memory cells have.

Upon reading, a voltage for determining threshold voltages of the selected memory cells is applied to the selected word line. Upon reading, a high voltage, a read voltage is applied to unselected word lines of the selected memory block. The read voltage enables threshold voltages of the unselected memory cells of the selected memory block to vary. For example, the read voltage enables threshold voltages of the unselected memory cells to be disturbed. Also, an elapse of time may disturb threshold voltages of memory cells. The reliability verification read operation may be a read operation for determining how much unselected memory cells of the selected memory block or sub block are disturbed. For example, the reliability verification read operation may include counting the number of disturbed memory cells, not having the reference state, from among memory cells programmed to the reference state and determining whether the counted value exceeds a threshold or critical value.

Figure 5:
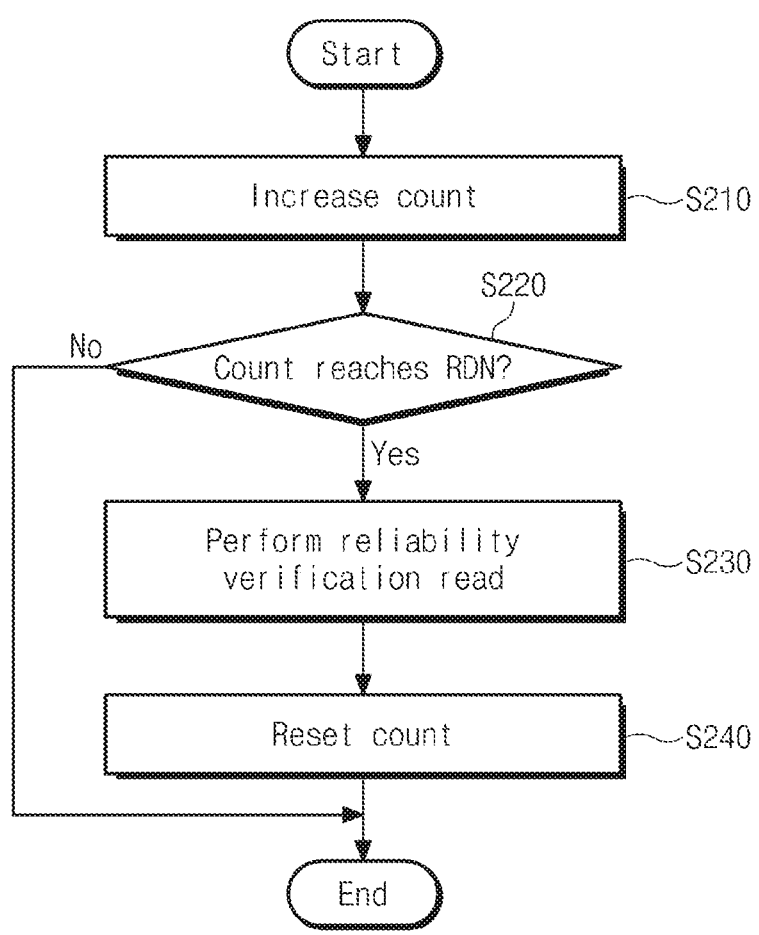
FIG. 5 is a flowchart showing an execution condition of a reliability verification read operation according to an embodiment of the inventive concept.

FIG. 5 is a flowchart showing an execution condition of a reliability verification read operation according to an embodiment of the inventive concept. Referring to FIGS. 1 through 5, in step S210, a count increases. For example, the count may increases when a read operation is performed depending on a second address ADDR2 and a second command CMD2 received from an external host device (S1020). For example, the count may increase whenever a read operation is executed.

In step S220, whether the count reaches a random number RDN is determined. For example, the memory controller 120 may determine whether a count of a counter 125 reaches a random number RDN that a random number generator 123 generates.

The reliability verification read operation is not performed when the count does not reach the random number RDN. When the count reaches the random number RDN, in step S230, the reliability verification read operation is executed. For example, whenever the count reaches the random number RDN, the memory controller 120 executes the reliability verification read operation, based on a read address associated with a read operation causing an increase in the count and thus causing the reliability verification read operation. When the reliability verification read operation is performed, in step S240, the counter 125 resets the count. Also, when the reliability verification read operation is executed, the random number generator 123 generates a new random number RDN.

Figure 6:
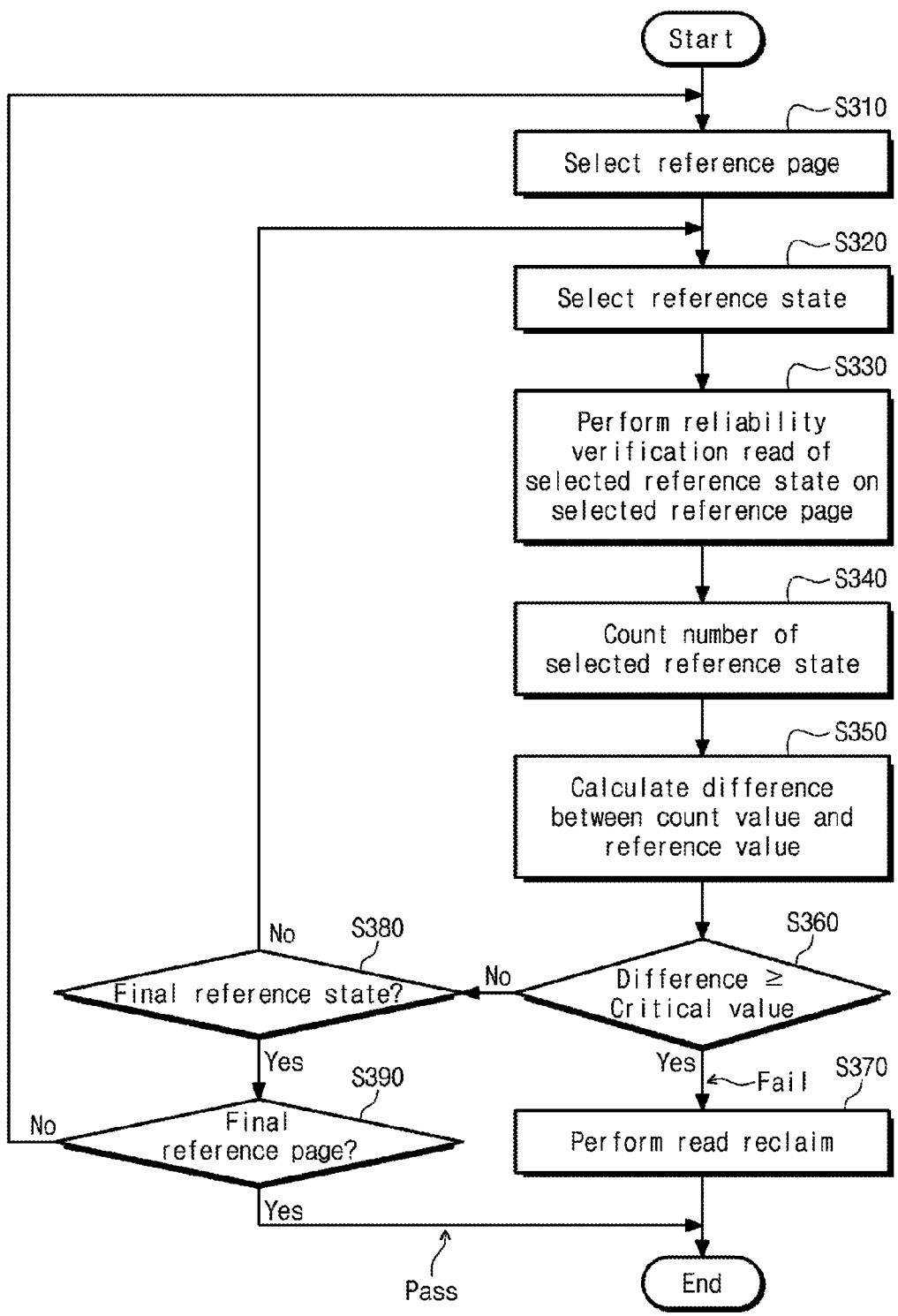
FIG. 6 is a flowchart showing a reliability verification read method according to an embodiment of the inventive concept.

FIG. 6 is a flowchart showing a reliability verification read method according to an embodiment of the inventive concept. Referring to FIGS. 3 and 6, in step S310, a reference page is selected. For example, an unselected page that does not correspond to a read address may be selected as the reference page. Selected as the reference page is a page corresponding to an unselected string selection line of a selected memory block or sub block or a page corresponding to a selected string selection line and an unselected word line. The reference page may be selected by a memory controller 120.

In step S320, a reference state is selected. Selected is the reference state, corresponding to a reliability verification read operation to be executed, from among an erase state and at least one program state that memory cells have, for example. For example, among states of memory cells, an erase state having the lowest threshold voltage distribution range or a program state having the highest threshold voltage distribution range may be selected. The reference state may be selected by the memory controller 120.

In step S330, the reliability verification read operation of the selected reference state is executed with respect to the selected reference page. For example, the reliability verification read operation may be executed with respect to memory cells of the selected reference page. The reliability verification read operation may be executed using a read voltage between the reference state and a state adjacent to the reference state. For example, the memory controller 120 provides a nonvolatile memory 110 with an address of the selected reference page, information indicating the selected reference state, and a command indicating the reliability verification read operation.

In step S340, the selected reference state may be counted. For example, the number of memory cells, corresponding to the reference state, from among memory cells of the reference page is counted based on a result of the reliability verification read operation. The memory controller 120 receives resultant data of the reliability verification read operation from the nonvolatile memory 110. The memory controller 120 counts the number of memory cells corresponding to the reference state, based on the resultant data.

In step S350, the memory controller 120 calculates a difference between the counted value and a reference value. For example, the number of memory cells, programmed to have the reference state, from among memory cells of the reference page may be used as the reference value. For example, the reference value may be a value counted from program data upon programming memory cells of the reference page.

In step S360, the memory controller 120 determines whether the difference is greater than or equal to a threshold or critical value. If so, the reliability verification read operation is determined as being failed. In step S370, a read reclaim operation is executed. For example, all or a portion of data stored at memory cells of a selected memory block or sub block is read under a control of the memory controller 120, and the read data is written at any other memory block or sub block.

When the difference is not greater than or equal to a critical value, i.e. the difference is smaller than the critical value, the method proceeds to step S380. In step S380, the memory controller 120 determines whether the selected reference state is a final reference state. For example, the memory controller 120 determines whether the reliability verification read operation is executed with respect to all reference states being a reliability verification read target. For example, the reliability verification read operation may be executed with respect to two or more reference states. For example, the reliability verification read operation may be executed with respect to an erase state and a program state having the highest threshold voltage distribution range. As another example, the reliability verification read operation may be executed with respect to one reference state. For example, the reliability verification read operation may be executed with respect to an erase state or a program state having the highest threshold voltage distribution range.

When the selected reference state is not the final reference state, in step S320, any other reference state is selected. Afterwards, the reliability verification read operation may be again performed from step S330. When the selected reference state is the final reference state, the method proceeds to step S390.

In step S390, the memory controller 120 determines whether the selected reference page is a final reference page.

For example, the memory controller 120 may determine whether the reliability verification read operation is executed with respect to all reference pages being a reliability verification read target.

For example, the reliability verification read operation may be performed with respect to memory cells of a page adjacent to the selected page. As illustrated in FIG. 3, in a three-dimensional memory block BLKa, a plurality of pages are adjacent to the selected page.

For example, pages adjacent to the selected page includes the following: a first page (e.g., an upper page of a selected page) corresponding to an upper word line of a selected word line and a selected string selection line, a second page (e.g., a lower page of the selected page) corresponding to a lower word line of the selected word line and the selected string selection line, a third page (e.g., a page at a first side of the selected page) corresponding to the selected word line and an unselected first string selection line, a fourth page (e.g., a page at a second side of the selected page) corresponding to the selected word line and an unselected second string selection line, a fifth page (e.g., a page at the first side and the upper of the selected page) corresponding to an upper word line of the selected word line and the unselected first string selection line, a sixth page (e.g., a page at the second side and the upper of the selected page) corresponding to the upper word line of the selected word line and the unselected second string selection line, a seventh page (e.g., a page at the first side and the lower of the selected page) corresponding to the lower word line of the selected word line and the unselected first string selection line, and an eighth page (e.g., a page at the second side and the lower of the selected page) corresponding to the lower word line of the selected word line and the unselected second string selection line. Also, the reliability verification read operation may be performed with respect to a page (s) at a predetermined position of the selected memory block or sub block. The reliability verification read operation may be executed with respect to the first through eighth pages and one or more pages or a page (or, pages) at predetermined position.

When the selected reference page is not the final reference page, the method proceeds to step S310, in which a next reference page is selected. When the selected reference page is the final reference page, the reliability verification read operation is determined as being passed. Afterwards, the reliability verification read operation is terminated without a read reclaim operation.

As described above, when the number of reference pages is "i" and the number of reference states is "j", the reliability verification read operation may be performed "i*j" times. When the difference is greater than or equal to the critical value during the reliability verification read operation, the reliability verification read operation is determined as being failed and is stopped. When the difference is smaller than the critical value during the reliability verification read operation, the reliability verification read operation is determined as being passed and is terminated.

Figure 7:
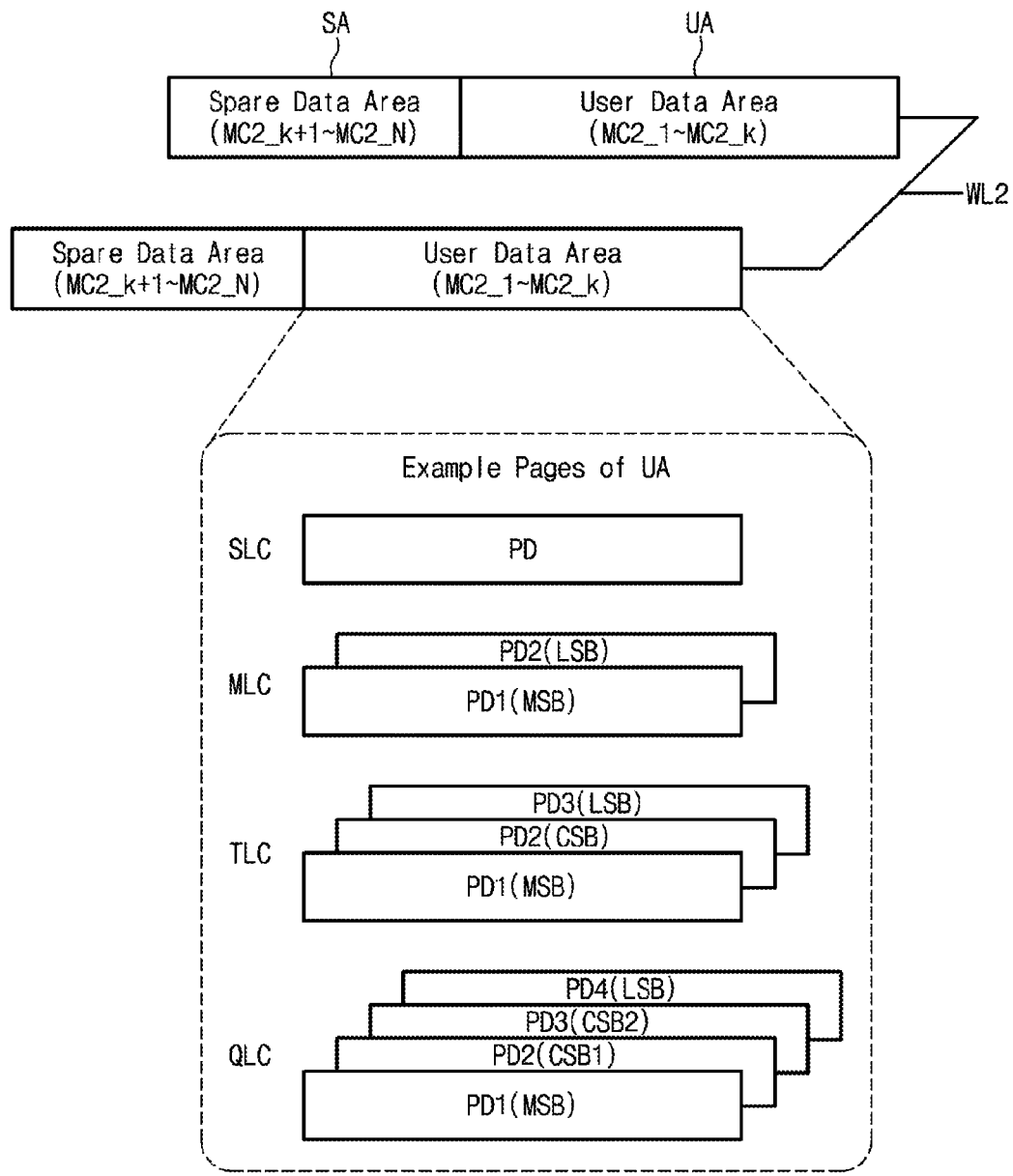
FIG. 7 is a diagram showing an example of data programmed at memory cells of a memory block.

FIG. 7 shows an example of data programmed at memory cells of a memory block BLKa. An embodiment of the inventive concept is exemplified in FIG. 7 as data is programmed at memory cells of rows connected to a second word line WL2.

Referring to FIGS. 1, 3, and 7, memory cells of a row are divided to belong to a user data area UA and a spare data area SA. For example, in each of the rows connected to the second word line WL2, first through k-th memory cells MC2_1 through MC2_$k$ are assigned to the user data area UA, and k+1$^{st}$ through N-th memory cells MCS2_$k$+1 through MC2_N are assigned to the spare data area SA.

User data received from an external host device is programmed at the user data area UA of each row. Meta information for managing a storage device 100 is programmed at the spare data area SA of each row. For example, meta information that a memory controller 120 generates may be programmed at the spare data area SA of each row. Reference values of the user data area UA may be programmed at the spare data area SA of each row. A reference value, that is, the number of memory cells, programmed to an erase state or a program state having the highest threshold voltage distribution range, from among memory cells of the user data area UA may be programmed at the spare data area SA as the meta information.

In the user data area UA of each row, each memory cell MC may be used as SLC (Single Level Cell), MLC (Multi Level Cell), TLC (Triple Level Cell), or QLC (Quadraple Level Cell). When the memory cells MC2_1 through MC2_$k$ are used as SLC, one bit is programmed at each memory cell. Bits programmed at the memory cells MC2_1 through MC2_$k$ of the user data area UA may form a piece of page data PD. That is, a piece of page data PD may be programmed at the user data area UA of one row.

When the memory cells MC2_1 through MC2_$k$ are used as MLC, two bits are programmed at each memory cell. First bits programmed at the memory cells MC2_1 through MC2_$k$ of the user data area UA, for example, MSBs may form first page data PD1. Second bits programmed at the memory cells MC2_1 through MC2_$k$ of the user data area UA, for example, LSBs may form second page data PD2. That is, two pieces of page data PD1 and PD2 may be programmed at the user data area UA of one row.

When the memory cells MC2_1 through MC2_$k$ are used as TLC, three bits are programmed at each memory cell. First bits programmed at the memory cells MC2_1 through MC2_$k$ of the user data area UA, for example, MSBs may form first page data PD1. Second bits programmed at the memory cells MC2_1 through MC2_$k$ of the user data area UA, for example, CSBs may form second page data PD2. Third bits programmed at the memory cells MC2_1 through MC2_$k$ of the user data area UA, for example, LSBs may form third page data PD3. That is, three pieces of page data PD1 through PD3 may be programmed at the user data area UA of one row.

When the memory cells MC2_1 through MC2_$k$ are used as QLC, four bits are programmed at each memory cell. First bits programmed at the memory cells MC2_1 through MC2_$k$ of the user data area UA, for example, MSBs may form first page data PD1. Second bits programmed at the memory cells MC2_1 through MC2_$k$ of the user data area UA, for example, first CSBs may form second page data PD2. Third bits programmed at the memory cells MC2_1 through MC2_$k$ of the user data area UA, for example, second CSBs may form third page data PD3. Fourth bits programmed at the memory cells MC2_1 through MC2_$k$ of the user data area UA, for example, LSBs may form fourth page data PD4. That is, four pieces of page data PD1 through PD4 may be programmed at the user data area UA of one row.

An embodiment of the inventive concept is exemplified as memory cells of the user data area UA are used as SLC, MLC, TLC, or QLC. However, the scope and spirit of the inventive concept may not be limited thereto. The spirit and scope of the inventive concept may be applied to the case that five or more bits are programmed at each memory cell.

The number of bits that are programmed at each of the memory cells MC2_k+1 through MC_N of the spare data area SA may be equal to or less than the number of memory cells MC2_1 through MC2_k of the user data are UA.

Figure 8:
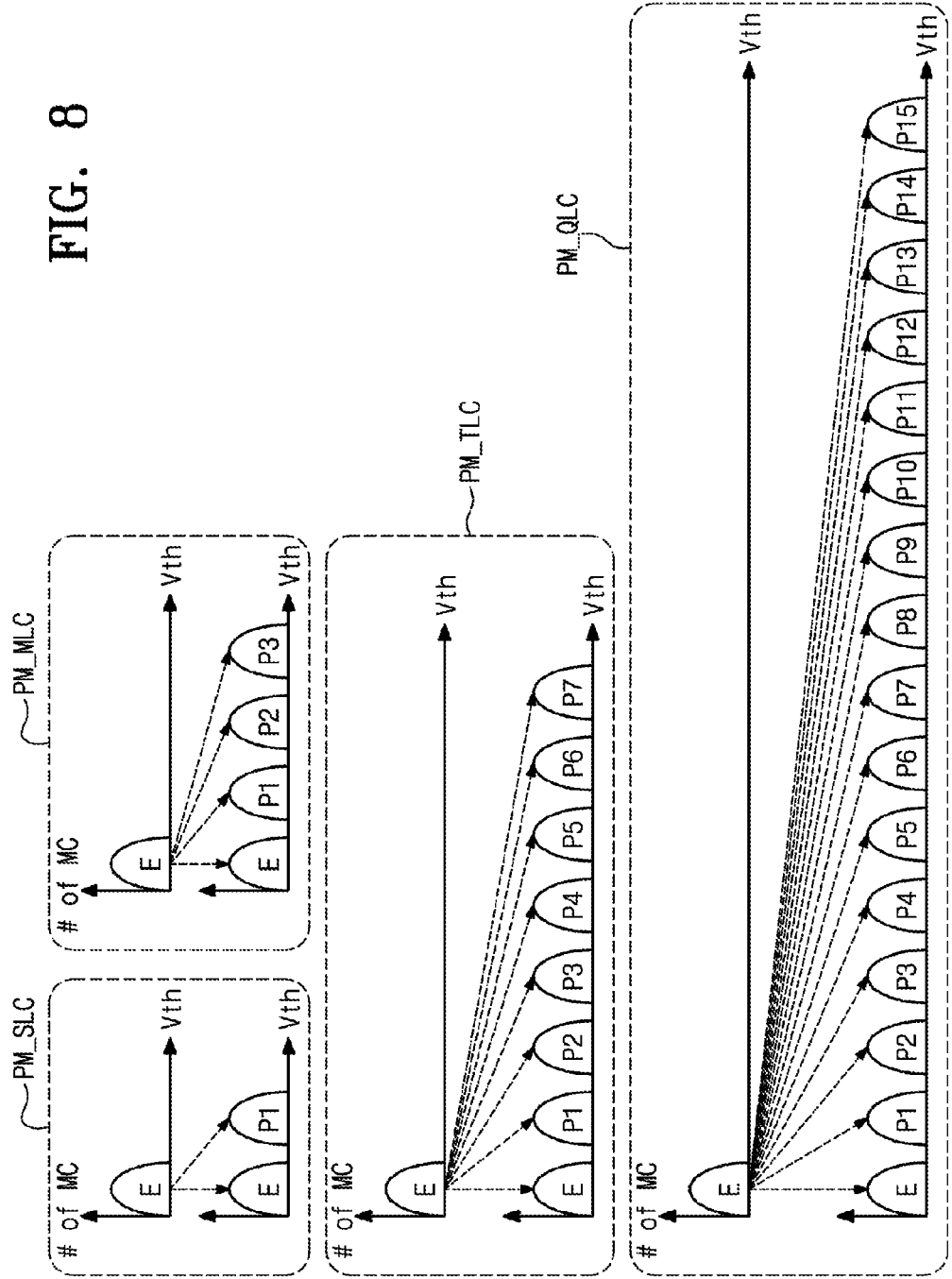
FIG. 8 is a diagram showing exemplary states of memory cells of a user data area.
Figure 9:
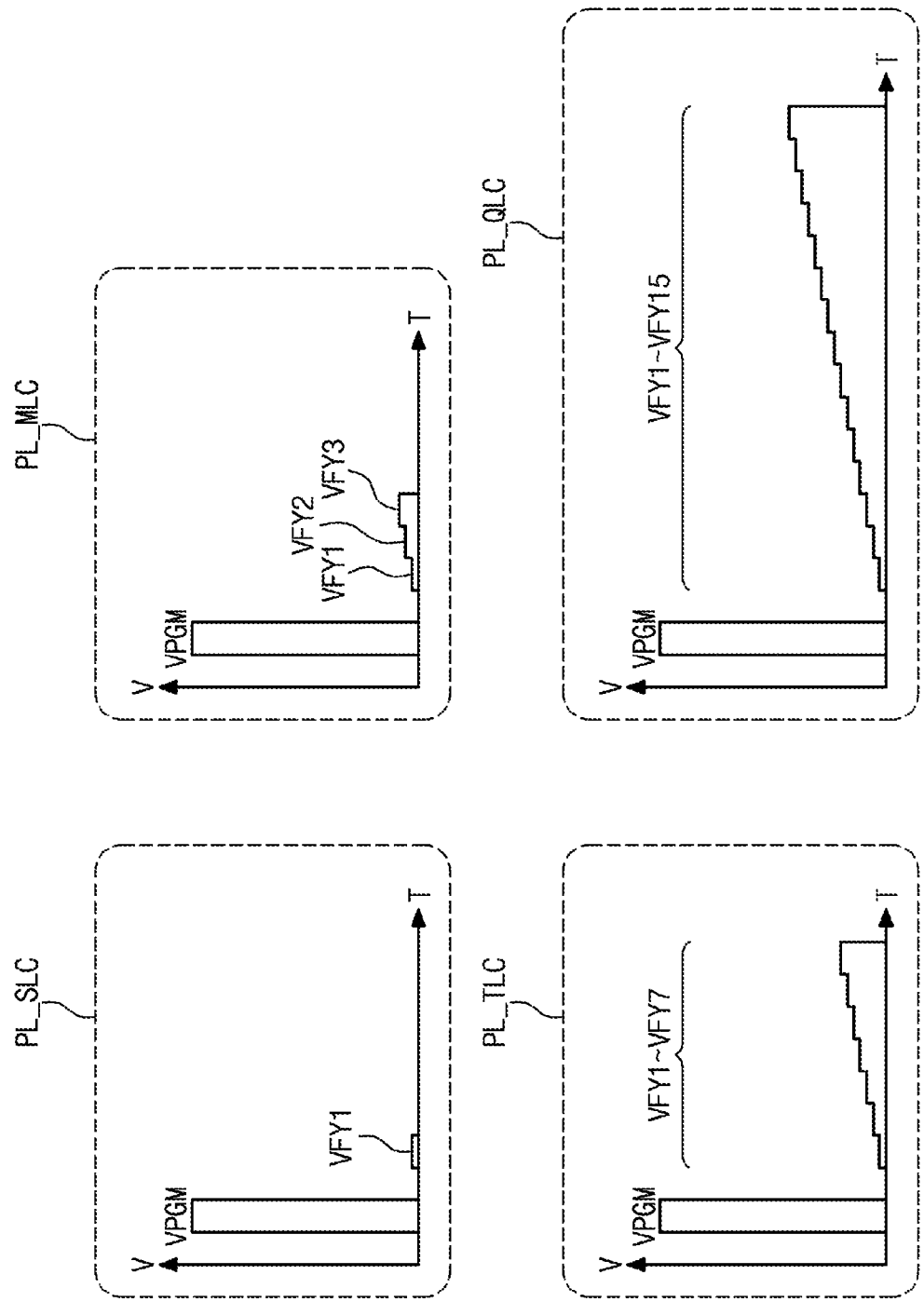
FIG. 9 is a diagram showing exemplary program loops iteratively executed upon programming memory cells of a user data area.

FIG. 8 shows exemplary states of memory cells MC2_1 through MC2_k of a user data area UA. FIG. 9 shows exemplary program loops iteratively executed upon programming memory cells MC2_1 through MC2_k of a user data area UA.

In FIG. 8, the abscissa, or horizontal coordinate, represents a threshold voltage Vth, and the ordinate, or vertical coordinate, represents the number of memory cells MC. In FIG. 9, the abscissa represents a time, and the ordinate represents a voltage.

Referring to FIGS. 7, 8, and 9, a first graph PM_SLC shows states when memory cells MC2_1 through MC2_k of a user data area UA are used as SLC. A first timing diagram PL_SLC shows a program loop executed when memory cells MC2_1 through MC2_k used as SLC are programmed. Once program data PD to be programmed at the memory cells MC2_1 through MC2_k is collected, the memory cells MC2_1 through MC2_k may be programmed from an erase state E to the erase state E and a program state P. Upon programming, a program voltage VPGM is applied to a word line connected with a selected page, and then a first verification voltage VFY1 is applied to the word line. Threshold voltages of memory cells to be programmed to the program state P may be increased by the program voltage VPGM. Whether programming of memory cells to be programmed to the program state P is completed is determined using the verification voltage VFY1.

When the memory cells MC2_1 through MC2_k are used as SLC, the erase state E having the lowest threshold voltage distribution range or the program state P having the highest threshold voltage distribution range may be used as a reference state. Once page data PD is collected, a memory controller 120 detects the number of erase states E or the number of program states P from the page data PD. The detected number may be programmed at a spare data area SA as a reference value. For example, the reference value may be programmed together with the page data PD.

At reliability verification reading, a read operation may be performed using a read voltage that has a level between the erase state E and the program state P. Memory cells each having a threshold voltage lower than the read voltage are counted as having the erase state E, and memory cells each having a threshold voltage higher than the read voltage are counted as having the program state P.

A second graph PM_MLC shows states when the memory cells MC2_1 through MC2_k are used as MLC. A second timing diagram PL_MLC shows a program loop executed when memory cells MC2_1 through MC2_k used as MLC are programmed. Once pieces of program data PD1 and PD2 to be programmed at the memory cells MC2_1 through MC2_k are collected, the memory cells MC2_1 through MC2_k may be programmed from an erase state E to the erase state E and first through third program states P1 through P3. Upon programming, a program voltage VPGM is applied to a word line connected with a selected page, and then first through third verification voltages VFY1 through VFY3 are applied to the word line. Threshold voltages of memory cells to be programmed to the first through third program states P1 through P3 may be increased by the program voltage VPGM. Whether programming of memory cells to be programmed to the first through third program states P1 through P3 is completed is determined using the first through third verification voltages VFY1 through VFY3.

When the memory cells MC2_1 through MC2_k are used as MLC, the erase state E having the lowest threshold voltage distribution range or the third program state P3 having the highest threshold voltage distribution range may be used as a reference state. Once pieces of page data PD1 and P2 are collected, the memory controller 120 detects the number of erase states E or the number of third program states P3 from the page data PD1 and PD2. The detected number may be programmed at the spare data area SA as a reference value. For example, the reference value may be programmed together with the page data PD1 and PD2.

At reliability verification reading, a read operation may be performed using a first read voltage having a level between the erase state E and the first program state P1 or a second read voltage having a level between the first program state P2 and the third program state P3. Memory cells each having a threshold voltage lower than the first read voltage are counted as having the erase state E, and memory cells each having a threshold voltage higher than the second read voltage are counted as having the third program state P3.

A third graph PM_TLC shows states when the memory cells MC2_1 through MC2_k are used as TLC. A third timing diagram PL_TLC shows a program loop executed when memory cells MC2_1 through MC2_k used as TLC are programmed. Once pieces of program data PD1 through PD3 to be programmed at the memory cells MC2_1 through MC2_k are collected, the memory cells MC2_1 through MC2_k may be programmed from an erase state E to the erase state E and first through seventh program states P1 through P7. Upon programming, a program voltage VPGM is applied to a word line connected with a selected page, and then first through seventh verification voltages VFY1 through VFY7 are applied to the word line. Threshold voltages of memory cells to be programmed to the first through seventh program states P1 through P7 may be increased by the program voltage VPGM. Whether programming of memory cells to be programmed to the first through seventh program states P1 through P7 is completed is determined using the first through seventh verification voltages VFY1 through VFY7.

When the memory cells MC2_1 through MC2_k are used as TLC, the erase state E having the lowest threshold voltage distribution range or the seventh program state P7 having the highest threshold voltage distribution range may be used as a reference state. Once pieces of page data PD1 through P3 are collected, the memory controller 120 detects the number of erase states E or the number of seventh program states P7 from the page data PD1 through PD3. The detected number may be programmed at the spare data area SA as a reference value. For example, the reference value may be programmed together with the page data PD1 through PD3.

At reliability verification reading, a read operation may be performed using a first read voltage having a level between the erase state E and the first program state P1 or a second read voltage having a level between the sixth program state P6 and the seventh program state P7. Memory cells each having a threshold voltage lower than the first read voltage are counted as having the erase state E, and memory cells each having a threshold voltage higher than the second read voltage are counted as having the seventh program state P7.

A fourth graph PM_QLC shows states when the memory cells MC2_1 through MC2_k are used as QLC. A fourth timing diagram PL_QLC shows a program loop executed when memory cells MC2_1 through MC2_k used as QLC are programmed. Once pieces of program data PD1 through PD4 to be programmed at the memory cells MC2_1 through MC2_k are collected, the memory cells MC2_1 through MC2_k may be programmed from an erase state E to the erase state E and first through fifteenth program states P1 through P15. Upon programming, a program voltage VPGM is applied to a word line connected with a selected page, and then first through fifteenth verification voltages VFY1 through VFY15 are applied to the word line. Threshold voltages of memory cells to be programmed to the first through fifteenth program states P1 through P15 may be increased by the program voltage VPGM. Whether programming of memory cells to be programmed to the first through fifteenth program states P1 through P15 is completed is determined using the first through fifteenth verification voltages VFY1 through VFY15.

When the memory cells MC2_1 through MC2_k are used as QLC, the erase state E having the lowest threshold voltage distribution range or the fifteenth program state P15 having the highest threshold voltage distribution range may be used as a reference state. Once pieces of page data PD1 through P4 are collected, the memory controller 120 detects the number or erase states E or the number of fifteenth program states P15 from the page data PD1 through PD4. The detected number may be programmed at the spare data area SA as a reference value. For example, the reference value may be programmed together with the page data PD1 through P4.

At reliability verification reading, a read operation may be performed using a first read voltage having a level between the erase state E and the first program state P1 or a second read voltage having a level between the fourteenth program state P14 and the fifteenth program state P15. Memory cells each having a threshold voltage lower than the first read voltage are counted as having the erase state E, and memory cells each having a threshold voltage higher than the second read voltage are counted as having the fifteenth program state P15.

When a read operation is performed at a selected memory block or sub block, read disturbances often occur at memory cells that have an erase state corresponding to the lowest threshold voltage distribution range or a program state corresponding to the highest threshold voltage distribution range. Thus, during the reliability verification read operation, memory cells are checked which have an erase state corresponding to the lowest threshold voltage distribution range or a program state corresponding to the highest threshold voltage distribution range.

Figure 10:
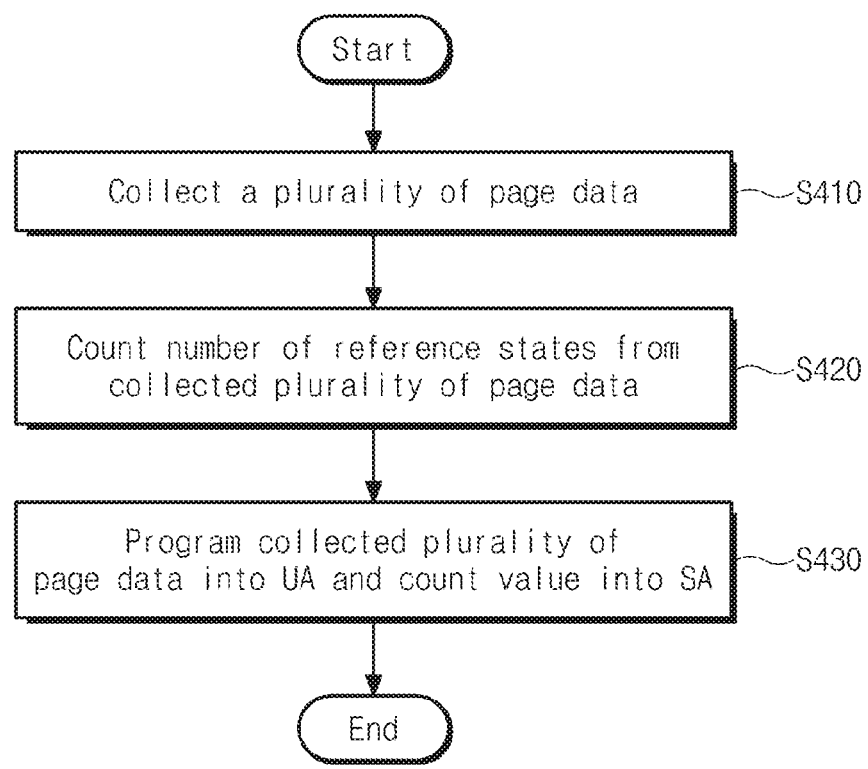
FIG. 10 is a flowchart showing an embodiment where a reference value is programmed.

FIG. 10 is a flowchart showing an embodiment where a reference value is programmed. Referring to FIGS. 1, 7, and 10, in step S410, a memory controller 120 collects page data. For example, the memory controller 120 collects a piece of page data PD when memory cells MC2_1 through MC2_k of a user data area UA are used as SLC. The memory controller 120 collects two pieces of page data PD1 and PD2 when the memory cells MC2_1 through MC2_k of the user data area UA are used as MLC. The memory controller 120 collects three pieces of page data PD1 through PD3 when the memory cells MC2_1 through MC2_k of the user data area UA are used as TLC. The memory controller 120 collects four pieces of page data PD1 through PD4 when the memory cells MC2_1 through MC2_k of the user data area UA are used as QLC. For example, page data may be collected at a RAM 130.

In step S420, the number of reference states included in the collected page data is counted. For example, the memory controller 120 may count a reference state of the page data collected at the RAM 130, for example, an erase state having the lowest threshold voltage distribution range or a program state having the highest threshold voltage distribution range.

In step S430, the memory controller 120 programs the collected page data at the user data area UA, and it programs the counted value at a spare data area SA as a reference value.

For example, at a reliability verification read operation, the reference value is read from the spare data area SA of a selected reference page. The read reference value is compared with a count value of a reference state read from the user data area UA of the selected reference page. For example, the reference value may be read from the spare data area SA with use of a read operation independent of the reliability verification read operation. As another example, the reference value may be read from the spare data area SA when the reliability verification read operation is performed. For example, the reference value may be only programmed to have an erase state E having the lowest threshold voltage distribution range and a program state having the highest threshold voltage distribution range. Thus, at the reliability verification read operation, the reference value is read from memory cells at which the reference value is programmed. To improve the reliability of the reference value, the reference value may be programmed at the spare data area SA two or more times.

As another example, when a storage device 100 is powered on, the reference value may be read from the spare data areas SA of a nonvolatile memory 110. The read reference value may be compared with a count value of a reference state read from the user data area UA of a reference page selected at the reliability verification read operation. In exemplary embodiments, the reference value may be programmed at a memory block or sub block allocated to store meta information, not at the spare data area SA of each row. In this case, it is possible to perform an operation for scanning a reference value quickly when the storage device 100 is powered on.

Figure 11:
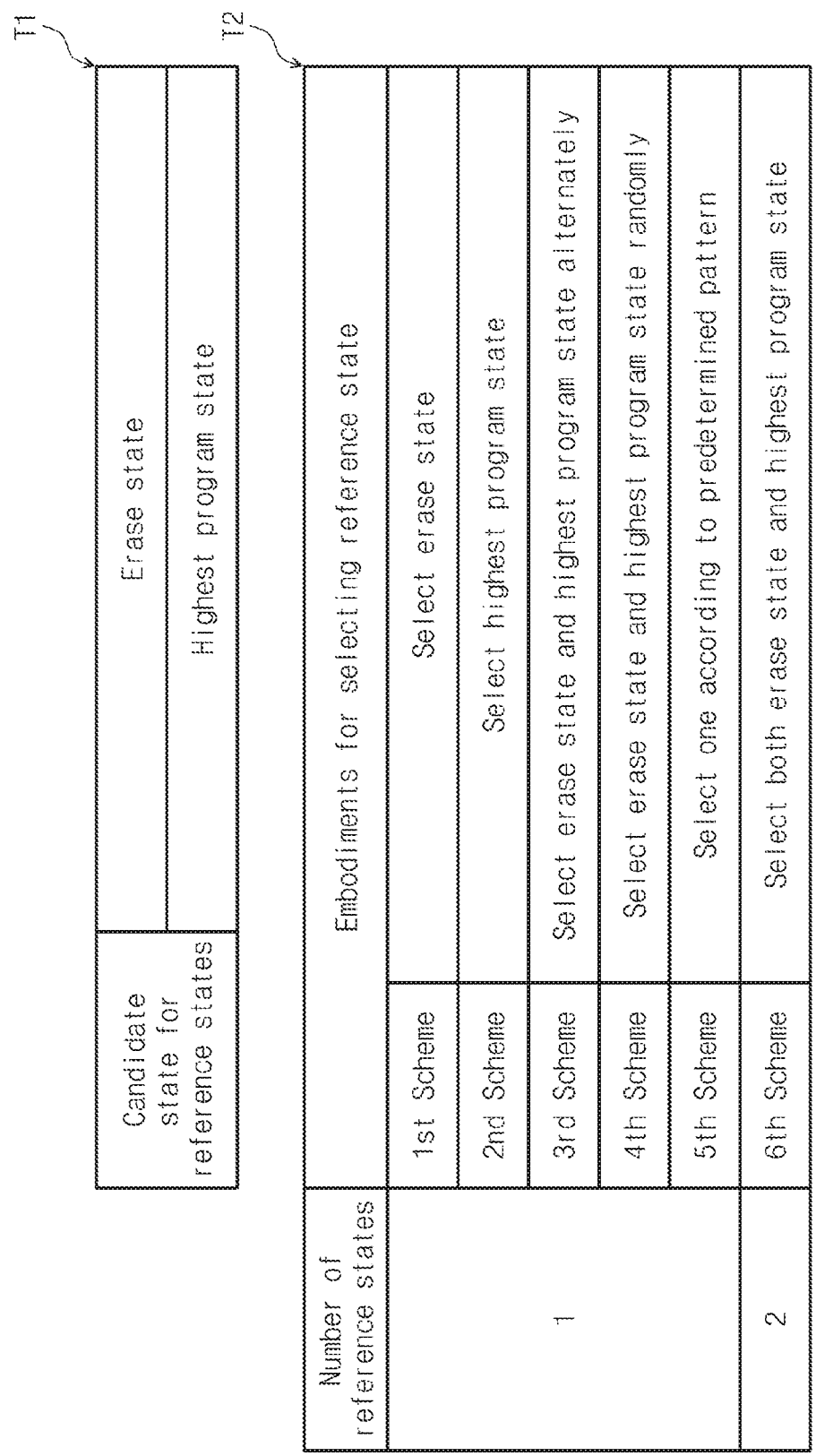
FIG. 11 is a table showing various embodiments of a reliability verification read operation performed with respect to a selected reference row.

FIG. 11 is a table showing various embodiments of a reliability verification read operation performed with respect to a selected reference page. Referring to FIGS. 6 and 11, a reference state of a selected reference page may be selected in various methods.

Referring to a first table T1, candidate states to be selected as a reference state may include an erase state E having the lowest threshold voltage and a program state (hereinafter referred to as "highest program state") having the highest program voltage (or, threshold voltage).

Referring to a second table T2, one or two reference states may be selected at a selected reference page. When one reference state is selected at the selected reference page, a reliability verification read operation is once performed with respect to the selected reference page. One of the erase state and the highest program state is selected as a reference state.

For example, in a first scheme, the erase state is constantly selected as the reference state. In a second scheme, the highest program state is constantly selected as the reference state. In a third scheme, the erase state and the highest program state are alternately selected as the reference state. For example, the erase state is selected as the reference state at a first reliability verification read operation, and the highest program state is selected as the reference state at a second reliability verification read operation following the first reliability verification read operation. In a fourth scheme, the erase state and the highest program state are randomly selected as the reference state. For example, the erase state or the highest program state is selected based on whether a random number RDN causing the reliability verification read operation is odd-numbered or even-numbered. For example, the erase state or the highest program state is selected based on whether the random number RDN belongs to a first range or a second range. In a fifth scheme, the erase state or the highest program state are randomly selected as the reference state, based on a predetermined pattern.

When two reference states are selected at the selected reference page, the reliability verification read operation is performed two times with respect to the selected reference page. On this occasion, both the erase state and the highest program state are selected as the reference state, based on a sixth scheme.

In exemplary embodiments, the number of reference states of a selected reference page may be selected in a manner similar to that in the first through fifth schemes. When a reference page is selected, for example, reference states where the reliability verification read operation will be executed may be selected at the selected reference page. One or two reference states are constantly selected at the selected reference page. One or two reference states are alternately selected at the selected reference page. One or two reference states are randomly selected at the selected reference page. In the selected reference page, the number of reference states may be decided based on a predetermined pattern.

In exemplary embodiments, a reference state may be selected based on the first scheme when memory cells of a selected reference page are memory cells each having an erase state E before programming.

FIGS. 12 and 13 are tables showing various embodiments for selecting a reference page. Referring to FIGS. 12 and 13, a reference page may be selected in various methods.

Referring to FIGS. 6 and 12, candidate pages to be selected as a reference page may include first through eleventh pages R1 through R11. The first page R1 corresponds to an upper word line of a selected word line and a selected string selection line. The first page R1 may be a page that is placed at the upper of the selected page. The second page R2 corresponds to a lower word line of the selected word line and the selected string selection line. The second page R2 may be a page that is placed at the lower of the selected page.

The third page R3 corresponds to the selected word line and an unselected first string selection line. The third page R3 may be a page that is placed at a first side of the selected page. The fourth page R4 corresponds to the selected word line and an unselected second string selection line. The fourth page R4 may be a page that is placed at a second side of the selected page.

The fifth page R5 corresponds to the upper word line of the selected word line and the unselected first string selection line. The fifth page R5 may be a page that is placed at the first side and the upper of the selected page. The sixth page R6 corresponds to the upper word line of the selected word line and the unselected second string selection line. The sixth page R6 may be a page that is placed at a second side and the upper of the selected page. The seventh page R7 corresponds to the lower word line of the selected word line and the unselected first string selection line. The seventh page R7 may be a page that is placed at the first side and the lower of the selected page. The eighth page R8 corresponds to the lower word line of the selected word line and the unselected second string selection line. The eighth page R8 may be a page that is placed at the second side and the lower of the selected page.

The ninth page R9 corresponds to a predetermined word line and the selected string selection line. The tenth page R10 corresponds to the predetermined word line and the unselected first string selection line. The eleventh page R11 corresponds to the predetermined word line and the unselected second string selection line. In a selected memory block or sub block, reliability on some of memory cells may be lower than that of the other memory cells. For example, when a memory block BLKa is fabricated, channels of memory cells corresponding to a specific height may be formed defectively, not normally. A position where memory cells with low reliability are placed may be obtained experimentally or through testing. A word line that is connected with the memory cells with low reliability may be used as a predetermined word line at the reliability verification read operation.

Referring to FIGS. 6 and 13, the number of reference pages may range from 1 to 11. When the number of reference pages is "1", a reference page is selected based on a first scheme. In the first scheme, a reference page may be selected constantly, alternately, randomly, or according to a predetermined pattern. For example, at the reliability verification read operation, one of first through eleventh pages R1 through R11 is constantly selected as the reference page. During the reliability verification read operation, the first through eleventh pages R1 through R11 or some of the first through eleventh pages R1 through R11 may be selected alternately and one by one. During the reliability verification read operation, one of the first through eleventh pages R1 through R11 or one of some of the first through eleventh pages R1 through R11 may be randomly selected. One of the first through eleventh pages R1 through R11 or one of some of the first through eleventh pages R1 through R11 may be selected according to a predetermined pattern during the reliability verification read operation.

When the number of reference pages is "2", reference pages are selected based on a second scheme. In the second scheme, the reference pages may be selected constantly, randomly, alternately, or according to a predetermined pattern. When the number of reference pages is "k" (k being a positive integer greater than 2 and smaller than 11), reference pages may be selected based on a k-th scheme. In the k-th scheme, the reference pages may be selected constantly, randomly, alternately, or according to a predetermined pattern. When the number of reference pages is "11", reference pages are selected based on an eleventh scheme. In the eleventh scheme, all of the first through eleventh pages R1 through R11 may be selected as reference pages.

In exemplary embodiments, the number of reference pages may be selected similarly to the first through eleventh schemes. For example, as illustrated in FIG. 5, when a reliability verification read condition is satisfied, the number of reference pages where the reliability verification read operation will be executed may be selected. For example, the number of reference pages may be fixed to one of 1 through 11. One reference page through eleven reference pages may be alternately selected, or some of one reference page through eleven reference pages may be alternately selected. One reference page through eleven reference pages may be randomly selected, or some of one reference page through eleven reference pages may be randomly selected. One reference page through eleven reference pages may be selected based on a predetermined pattern, or some of one reference page through eleven reference pages may be selected based on a predetermined pattern.

Figure 14:
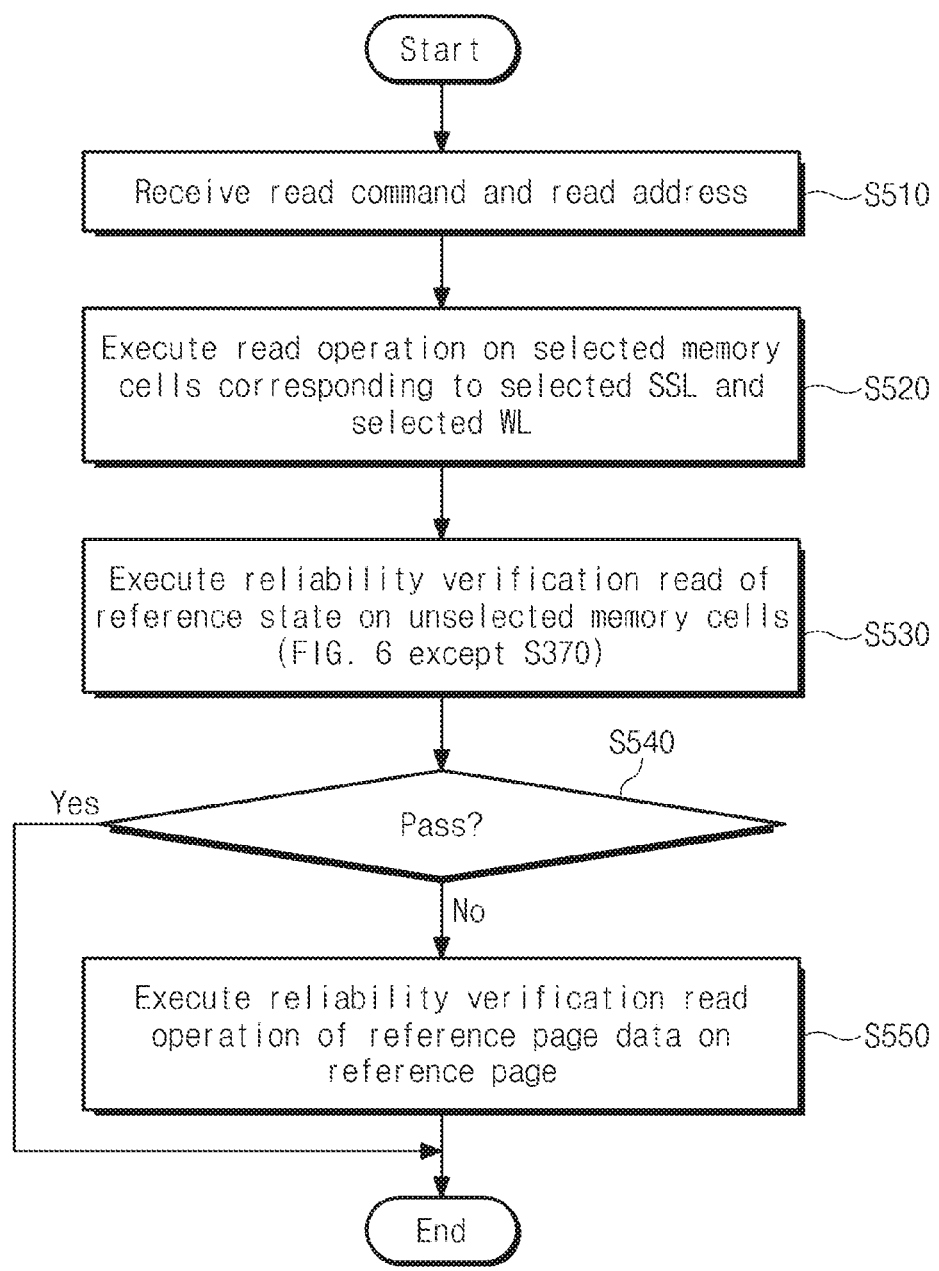
FIG. 14 is a flowchart showing an operating method of a storage device according to another embodiment of the inventive concept.

FIG. 14 is a flowchart showing an operating method of a storage device 100 according to another embodiment of the inventive concept. Referring to FIGS. 1 and 14, in step S510, a read command and a read address are received. In step S520, a read operation is executed with respect to a selected page corresponding to a selected string selection line and a selected word line. Steps S510 and S520 may be executed in the same manner as steps S110 and S120 of FIG. 4.

In step S530, a reliability verification read operation of a reference state is executed with respect to the reference page. The reliability verification read operation performed in step S530 is substantially the same as that described with reference to FIG. 6, except step S370 where a read reclaim operation is performed. That is, in step S530, the read reclaim operation is not performed even though the reliability verification read operation is determined as being failed.

In step S540, whether the reliability verification read operation is passed is determined. If so, the method ends. If not, the method proceeds to step S550, in which reference page data is read from the reference page for the reliability verification read operation.

In exemplary embodiments, the reliability verification read operation about the reference page data may be executed with respect to a reference page where the reliability verification read operation of the reference state is determined as being failed. On this occasion, at the reliability verification read operation about the reference state, the reliability verification read operation may be not stopped but continuously performed even though the reliability verification read operation is determined as being failed. Information of the reference page where the reliability verification read operation is determined as being failed may be separately stored. The reliability verification read operation about the reference page data may be executed based on the separately stored information.

As another example, the reliability verification read operation about the reference page data may be performed regardless of a result of the reliability verification read operation about the reference page data. At the reliability verification read operation about the reference page data, a reference page may be selected based on a method that is described with reference to FIGS. 12 and 13.

Figure 15:
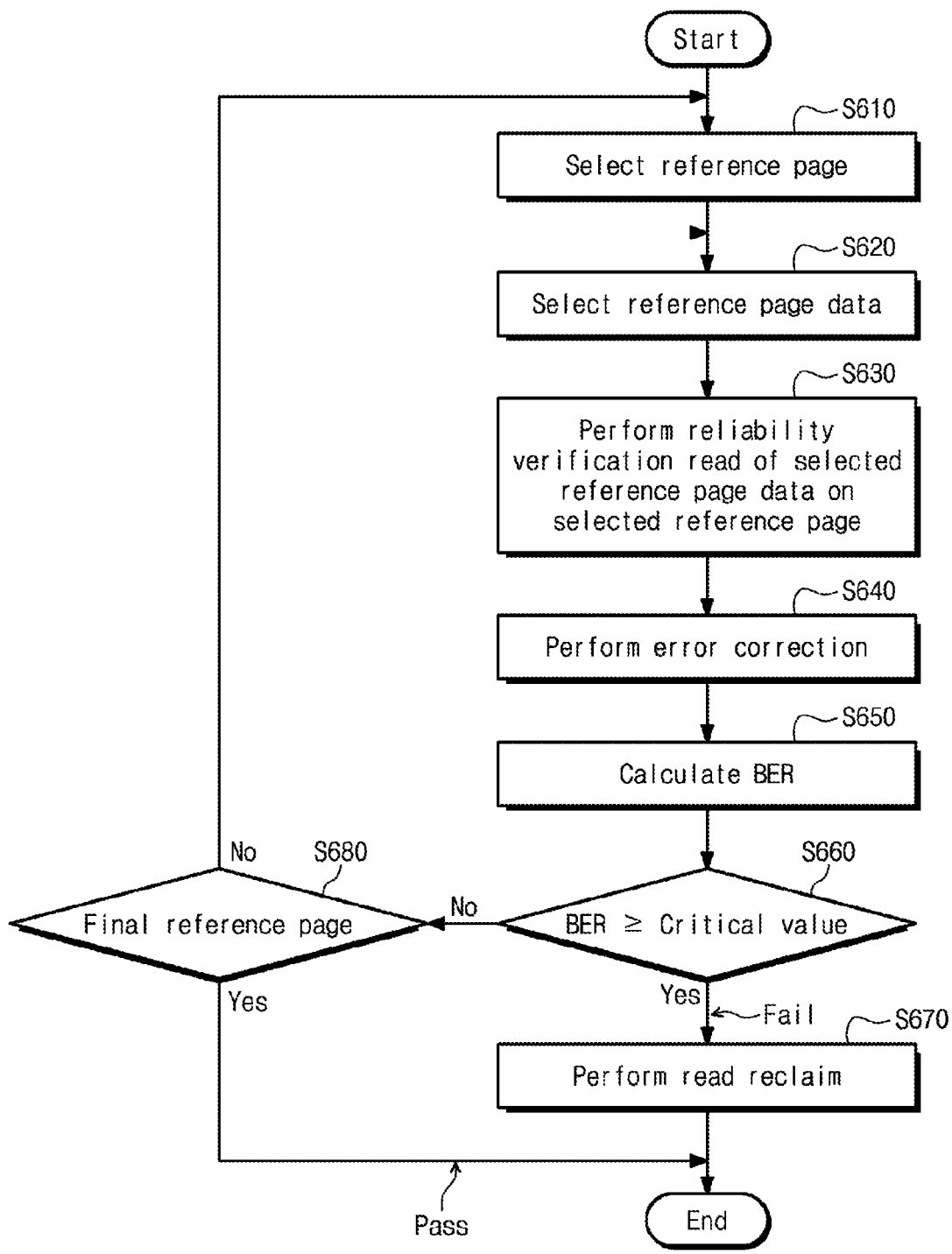
FIG. 15 is a flowchart showing a method where a reliability verification read operation is performed with respect to reference page data.

FIG. 15 is a flowchart showing a method (S350 of FIG. 6) where a reliability verification read operation is performed with respect to reference page data. Referring to FIGS. 1, 3, 14, and 15, in step S610, a memory controller 120 selects a reference page.

In step S620, the memory controller 120 selects the reference page data. For example, one or more pieces of page data of page data programmed at a selected page are selected as the reference page data.

In step S630, the reliability verification read operation about the selected reference page data is performed with respect to the selected reference page. For example, the memory controller 120 provides a nonvolatile memory 110 with an address of the selected reference page, information indicating the selected reference page data, and a command indicating the reliability verification read operation. A read operation about the selected reference page data may be executed with respect to the selected reference page under a control of the memory controller 120. For example, two or more pieces of page data may be selected from the selected page as the reference page data. The two or more pieces of page data selected as the reference page data may be read simultaneously or continuously. The two or more pieces of page data thus read may be transmitted from the nonvolatile memory 110 to the memory controller 120.

In step S640, the memory controller 120 performs error correction with respect to the read reference page data. The memory controller 120 receives the read reference page data from the nonvolatile memory 110, and an error correction block 127 of the memory controller 120 corrects an error of the read reference page data.

In step S650, the memory controller 120 calculates a bit error ratio (BER) of the read reference page data. The memory controller 120 calculates the bit error ratio based on a result of the error correction about the read reference page data.

In step S660, the memory controller 120 determines whether the calculated bit error ratio is greater than or equal to a threshold or critical value. When the calculated bit error ratio is greater than or equal to the critical value, the reliability verification read operation about the reference page data is determined as being failed. In step S670, the memory controller 120 stops the reliability verification read operation about the reference page data and performs a read reclaim. When the calculated bit error ratio is smaller than the critical value, the method proceeds to step S680.

In step S680, the memory controller 120 determines whether the selected reference page is a final reference page. When the selected reference page is the final reference page, the reliability verification read operation about the reference page data is determined as being failed and the method ends. When the selected reference page is not the final reference page, the method proceeds to step S610, in which any other reference page is selected to perform the reliability verification read operation about the reference page data.

Figure 16:
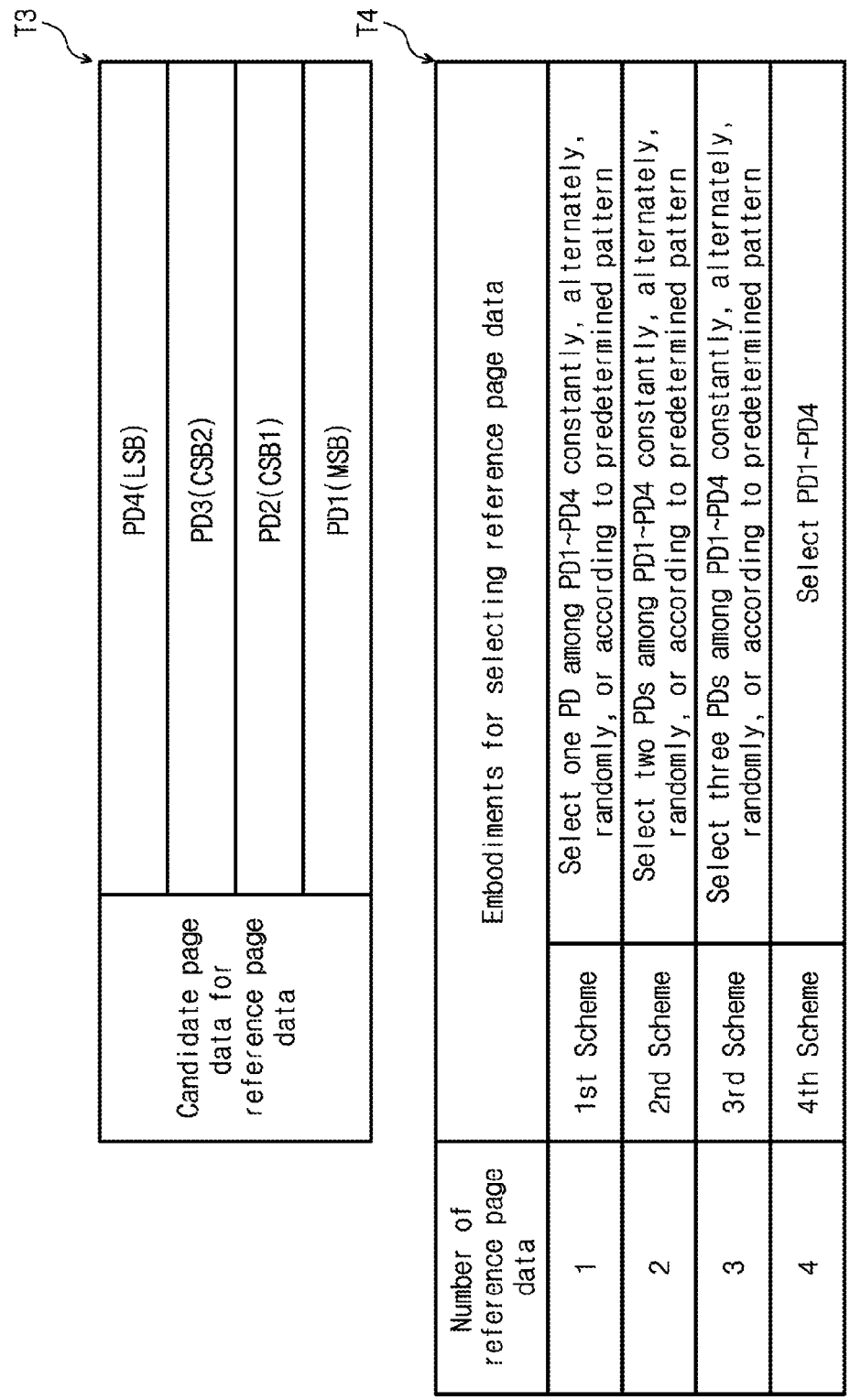
FIG. 16 is a table showing various embodiments of a reliability verification read operation executed with respect to a selected reference row.

FIG. 16 is a table showing various embodiments of a reliability verification read operation executed with respect to a selected reference page. Referring to FIGS. 15 and 16, reference page data may be selected at a selected reference page in various methods. Illustrated in FIG. 16 are embodiments where reference page data is selected when memory cells MC are used as QLC.

Referring to a third table T3, candidate page data selected as reference page data may be pieces of page data PD1 through PD4 that are programmed at a reference page.

Referring to a fourth table T4, one of one piece of reference page data through four pieces of reference page data of the selected reference page may be selected as reference page data. When one piece of reference page data is selected at the selected reference page, a first scheme is used to select reference page data constantly, alternately, randomly, or according to a predetermined pattern. For example, during the reliability verification read operation, one of first through fourth page data PD1 through PD4 may be selected as reference page data constantly. During the reliability verification read operation, the first through fourth page data PD1 through PD4 or some of the first through fourth page data PD1 through PD4 may be selected as reference page data alternately and one by one. One of the first through fourth page data PD1 through PD4 or one of some of the first through fourth page data PD1 through PD4 may be selected as reference page data randomly when the reliability verification read operation is executed. One of the first through fourth page data PD1 through PD4 or one of some of the first through fourth page data PD1 through PD4 may be selected as reference page data according to a predetermined pattern at the reliability verification read operation.

When two pieces of reference page data are selected at the selected reference page, a second scheme is used to select reference page data constantly, alternately, randomly, or according to a predetermined pattern. When three pieces of reference page data are selected at the selected reference page, a third scheme is used to select reference page data constantly, alternately, randomly, or according to a predetermined pattern. When four pieces of reference page data are selected at the selected reference page, a fourth scheme is used to select reference page data constantly, alternately, randomly, or according to a predetermined pattern.

In exemplary embodiments, the number of reference page data of a selected reference page may be selected similarly to the first through fourth schemes. For example, when a reference page is selected, the number of reference page data at which the reliability verification read operation will be executed may be selected at the selected reference page. For example, in the selected reference page, the number of reference page data may be constantly fixed to one of 1 through 4. In the selected reference page, one piece of reference page data through four pieces of reference page data or some of one piece of reference page data through four pieces of reference page data may be alternately selected. In the selected reference page, one piece of reference page data through four pieces of reference page data or some of one piece of reference page data through four pieces of reference page data may be randomly selected. In the selected reference page, the number of reference page data may be selected according to a predetermined pattern.

In exemplary embodiments, the reliability verification read operation about reference page data may be skipped with respect to a selected reference page when memory cells of the selected reference page are memory cells each having an erase state E before programming.

FIG. 17 is a table showing an embodiment where a reliability verification read condition is adjusted. Referring to FIGS. 1, 2, 3, and 17, a memory controller 120 may adjust a reliability verification read condition, based on a peripheral environment.

As a program or erase count of a memory block BLKa or a sub block increases, a bit error ratio of data stored at memory cells of the memory block BLKa or sub block increases. Thus, as a program or erase count of the memory block BLKa or sub block increases, a memory controller 120 decreases a range or an average of a random number RDN associated with the memory block BLKa or sub block. Also, as a program or erase count of the memory block BLKa or sub block increases, the memory controller 120 additionally performs the reliability verification read operation about at least one page of the memory block BLKa or sub block at least once.

As the number of read operations to be executed after data is written at the memory block BLKa or sub block increases, a bit error ratio of data stored at memory cells of the memory block BLKa or sub block increases. Thus, as the number of read operations to be executed after data is written at the memory block BLKa or sub block increases, the memory controller 120 decreases a range or an average of a random number RDN associated with the memory block BLKa or sub block. Also, as the number of read operations to be executed after data is written at the memory block BLKa or sub block increases, the memory controller 120 additionally performs the reliability verification read operation about at least one page of the memory block BLKa or sub block at least once.

As the time elapsed increases after data is written at the memory block BLKa or sub block, a bit error ratio of data stored at memory cells of the memory block BLKa or sub block increases. Thus, as the elapsed time increases after data is written at the memory block BLKa or sub block, the memory controller 120 decreases a range or an average of a random number RDN associated with the memory block BLKa or sub block. Also, as the elapsed time increases after data is written at the memory block BLKa or sub block, the memory controller 120 additionally performs the reliability verification read operation about at least one page of the memory block BLKa or sub block at least once.

For example, the time elapsed after data is written may be detected from a program time stamp PTS that is generated when data is written. For example, the program time stamp PTS means a time that elapses from a programming point in time. As another example, the program time stamp PTS means a time when programming is performed. The memory controller 120 compares the program time stamp PTS with a current time to detect an elapsed time.

When the time elapsed is very short after data is written at the memory block BLKa or sub block, for example, shorter than a first reference time, the probability that an error is generated at data stored at memory cells of the memory block BLKa or sub block may be very high. Thus, when the time elapsed is shorter than the first reference time, after data is written at the memory block BLKa or sub block, the reliability verification read operation may be skipped even though the reliability verification read condition is satisfied.

As another example, when the time elapsed is very short after data is written at the memory block BLKa or sub block, for example, shorter than a second reference time shorter than the first reference time, data stored at memory cells of the memory block BLKa or sub block is not stabilized, thereby increasing the probability that an error is generated. Thus, when the time elapsed is shorter than the second reference time, after data is written at the memory block BLKa or sub block, the memory controller 120 performs the reliability verification read operation once more.

The memory controller 120 may perform the reliability verification read operation at least once more or as little as at least once less, based on whether data of selected memory cells is random data or sequential data.

When information memory cells with low reliability exist and memory cells with low reliability are not verified at the reliability verification read operation, the memory controller 120 performs the reliability verification read operation with respect to memory cells with low reliability using a method described with reference to FIGS. 6 through 15 at least once more.

FIG. 18 is a table showing embodiments of a read reclaim operation that a storage device 100 according to an embodiment of the inventive concept performs. Referring to FIGS. 1, 2, 3, and 18, a storage device 100 performs a read reclaim operation based on one of first through fifth schemes.

In the first scheme, data that is programmed at selected memory cells of a page selected according to a read address ADDR1 is copied to any other memory block or sub block.

In the second scheme, the data that is programmed at the selected memory cells of the page selected according to the read address ADDR1 is copied to any other memory block or sub block. Also, data that is programmed at memory cells of a reference page experiencing the reliability verification read operation is copied to any other memory block or sub block. For example, data of a reference page, at which the reliability verification read operation is determined as being failed, from among reference pages experiencing the reliability verification read operation may be copied to any other memory block or sub block.

In the third scheme, data that is programmed at memory cells of a reference page experiencing the reliability verification read operation is copied to any other memory block or sub block. For example, data of a reference page, at which the reliability verification read operation is determined as being failed, from among reference pages experiencing the reliability verification read operation may be copied to any other memory block or sub block.

In the fourth scheme, data that is programmed at all memory cells of a memory block or sub block, for example, a group including memory cells of a reference page experiencing the reliability verification read operation and selected memory cells of a selected page is copied to any other memory block or sub block.

In the fifth scheme, a memory block or sub block, for example, a group including memory cells of a reference page experiencing the reliability verification read operation and selected memory cells of a selected page is closed. The closed memory block or sub block may be used as a read-only area until being erased or until all data stored at the closed memory block or sub block is invalidated.

Figure 19:
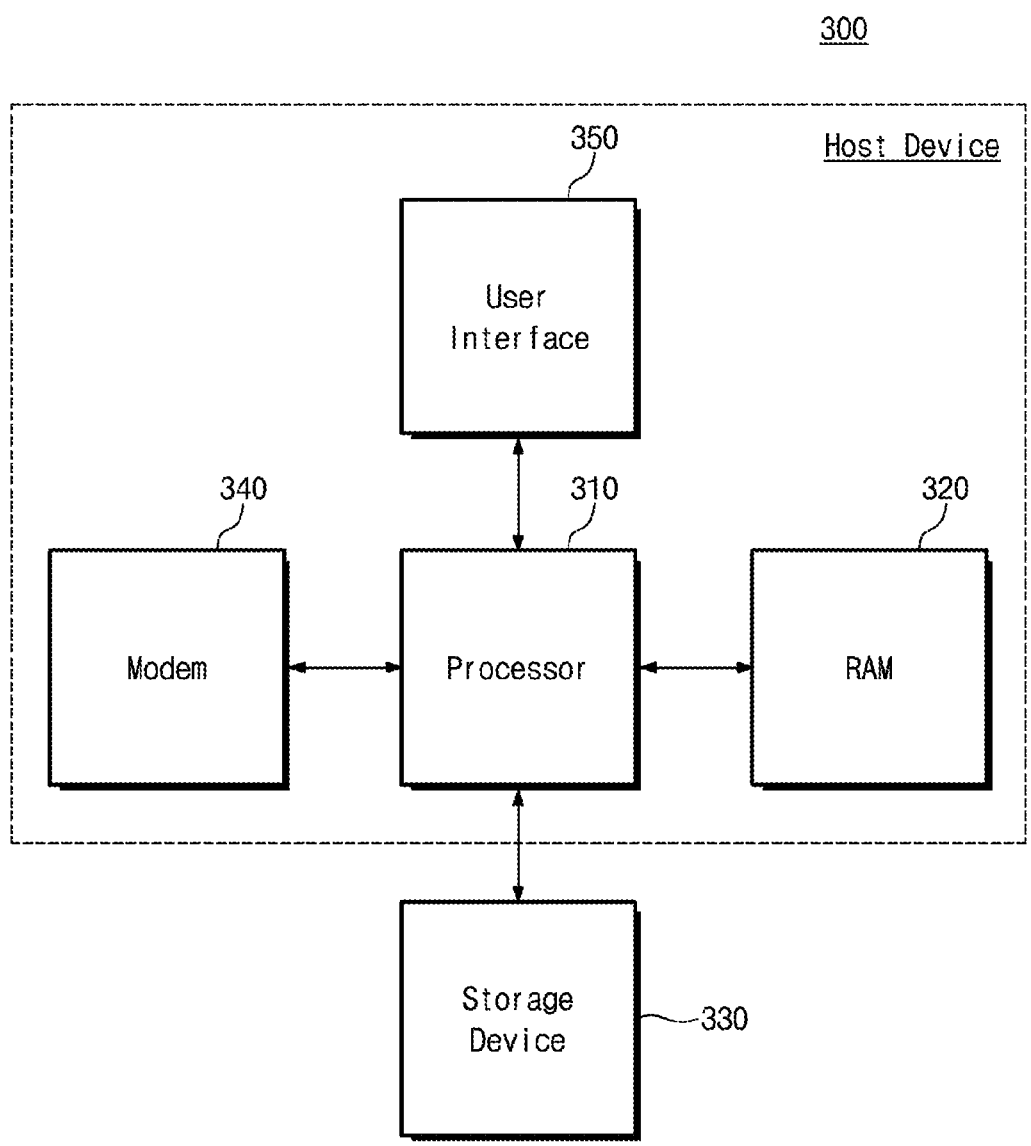
FIG. 19 is a block diagram schematically illustrating a computing device according to an embodiment of the inventive concept.

FIG. 19 is a block diagram schematically illustrating a computing device 300 according to an embodiment of the inventive concept. Referring to FIG. 19, a computing device 300 includes a processor 310, a RAM 320, a storage device 330, a modem 340, and a user interface 350.

The processor 310 controls an overall operation of the computing device 300 and performs a logical operation. The processor 310 is formed of a system-on-chip (SoC). The processor 310 may be a general purpose processor, a specific-purpose processor, or an application processor.

The RAM 320 communicates with the processor 310. The RAM 320 may be a main memory of the processor 310 or the computing device 300. The processor 310 stores codes or data in the RAM 320 temporarily. The processor 310 executes codes using the RAM 320 to process data. The processor 310 executes a variety of software, such as, but not limited to, an operating system and an application, using the RAM 320. The processor 310 controls an overall operation of the computing device 300 using the RAM 320. The RAM 320 may include a volatile memory such as, but not limited to, a static RAM, a dynamic RAM, and a synchronous DRAM or a nonvolatile memory such as, but not limited to, a Phase-change RAM (PRAM), a Magnetic RAM (MRAM), a Resistive RAM (RRAM), and a Ferroelectric RAM (FRAM).

The storage device 330 communicates with the processor 310. The storage device 330 is used to store data for a long time. That is, the processor 310 stores data, which is to be stored for a long time, in the storage device 330. The storage device 330 stores a boot image for driving the computing device 300. The storage device 330 stores source code of a variety of software, such as an operating system and an application. The storage device 330 stores data that is processed by a variety of software, such as an operating system and an application.

In exemplary embodiments, the processor 310 loads source code stored in the storage device 330 on the RAM 320. The code loaded on the RAM 320 is executed to run a variety of software, such as an operating system, and an application. The processor 310 loads data stored in the storage device 330 on the RAM 320 and processes data loaded on the RAM 320. The processor 310 stores long-term data of data stored in the RAM 320 at the storage device 330.

The storage device 330 includes a nonvolatile memory, such as, but not limited to, a flash memory, a PRAM (Phase-change RAM), an MRAM (Magnetic RAM), an RRAM (Resistive RAM), and an FRAM (Ferroelectric RAM).

The modem 340 communicates with an external device according to control of the processor 310. For example, the modem 340 communicates with the external device in a wire or wireless manner. The modem 340 may communicate with the external device, based on at least one of wireless communications manners such as LTE (Long Term Evolution), WiMax, GSM (Global System for Mobile communication), CDMA (Code Division Multiple Access), Bluetooth, NFC (Near Field Communication), WiFi, and RFID (Radio Frequency Identification or wire communications manners such as USB (Universal Serial Bus), SATA (Serial AT Attachment), HSIC (High Speed Interchip), SCSI (Small Computer System Interface), Firewire, PCI (Peripheral Component Interconnection), PCIe (PCI express), NVMe (NonVolatile Memory express), UFS (Universal Flash Storage), SD (Secure Digital), SDIO, UART (Universal Asynchronous Receiver Transmitter), SPI (Serial Peripheral Interface), HS-SPI (High Speed SPI), RS232, I2C (Inter-integrated Circuit), HS-I2C, I2S, (Integrated-interchip Sound), S/PDIF (Sony/Philips Digital Interface), MMC (MultiMedia Card), and eMMC (embedded MMC).

The user interface 350 communicates with a user according to control of the processor 310. For example, the user interface 350 may include user input interfaces such as a keyboard, a keypad, a button, a touch panel, a touch screen, a touch pad, a touch ball, a camera, a microphone, a gyroscope sensor, and a vibration sensor. The user interface 350 may further include user output interfaces such as an LCD, an OLED (Organic Light Emitting Diode) display device, an AMOLED (Active Matrix OLED) display device, an LED, a speaker, and a motor.

The storage device 330 may include at least one of storage devices 100 and 200 according to embodiments of the inventive concept. The processor 210, RAM 320, modem 340, and user interface 350 may constitute a host device that communicates with the storage device 330.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operating method of a storage device which includes a nonvolatile memory and a memory controller configured to control the nonvolatile memory,
wherein the nonvolatile memory device comprises a plurality of memory blocks, each memory block comprising a plurality of memory cells connected to word lines and stacked a direction perpendicular to a substrate and string selection transistors connected to string selection lines,
wherein, in each memory block, memory cells located at a same height from the substrate are connected to a wordline in common, and
wherein the operating method comprises:
receiving a read command and an address;
performing a read operation on selected memory cells associated with a selected string selection line and a selected word line in a selected memory block in response to the read command and the address;
performing a first reliability verification read operation on memory cells associated with an upper or lower word line of the selected word line and the selected string selection line in the selected memory block;
performing a second reliability verification read operation on memory cells associated with an upper or lower word line of the selected word line and an unselected word line in the selected memory block;

performing a third reliability verification read operation on memory cells associated with the upper word line of the selected word line and the selected string selection line in the selected memory block; and counting a number of memory cells, each corresponding to at least one state of an erase state and program states of the unselected memory cells based on a result of at least one of the first, the second, and the third reliability verification read operations.

2. The operating method of claim 1, further comprising: calculating a difference between the number of the memory cells and a reference count value.

3. The operating method of claim 2, wherein the reference count value for memory cells corresponding to a string selection line and a wordline is calculated before data are written into the memory cells corresponding to the string selection line and the wordline.

4. The operating method of claim 2, further comprising: performing a read reclaim when the difference is more than or equal to a critical value.

5. The operating method of claim 1, wherein the number of memory cells corresponding to the erase state is counted by the controller based on the result of the third reliability verification read operation.

6. The operating method of claim 1, wherein the number of memory cells corresponding to a program state is counted by the controller based on the result of the third reliability verification read operation.

7. The operating method of claim 6, wherein the program state has a highest threshold voltage range among a plurality of program states.

8. The operating method of claim 1, wherein the first, the second, and the third reliability verification read operations are performed when a count of read operations on the selected memory block reaches a first value.

9. The operating method of claim 8, wherein the controller resets the count after performing at least one of the first, the second and the third reliability verification read operations.

10. The operating method of claim 8, wherein the controller generates a random number to update the first value after performing at least one of the first, the second and the third reliability verification read operations.

11. An operating method of a storage device which includes a nonvolatile memory and a memory controller configured to control the nonvolatile memory, wherein the nonvolatile memory device comprises a plurality of memory blocks, each memory block comprising a plurality of memory cells connected to word lines and stacked a direction perpendicular to a substrate and string selection transistors connected to string selection lines, wherein, in each memory block, memory cells located at a same height from the substrate are connected to a wordline in common, and wherein the operating method comprises:

performing a read operation on selected memory cells associated with a selected string selection line and a selected word line in a selected memory block in response to the read command and the address;

performing a reliability verification read on memory cells associated with the upper word line of the selected word line and the selected string selection line in the selected memory block; and counting a number of memory cells, each corresponding to at least one state of an erase state and program states of the unselected memory cells based on a result of the reliability verification read operation.

12. A storage device comprising:

a nonvolatile memory device; and a controller to control the nonvolatile memory device, wherein the nonvolatile memory device comprises a plurality of memory blocks, each memory block comprising a plurality of memory cells connected to word lines and stacked a direction perpendicular to a substrate and string selection transistors connected to string selection lines, wherein in each memory block, memory cells located at a same height from the substrate are connected to a wordline in common wherein the controller receives a read command and an address from an external device, performs a read operation on selected memory cells associated with a selected string selection line and a selected word line in a selected memory block in response to the read command and the address, wherein the controller controls the nonvolatile memory device to perform a first reliability verification read operation on memory cells associated with an upper or lower word line of the selected word line and the selected string selection line in the selected memory block, a second reliability verification read operation on memory cells associated with an upper or lower word line of the selected word line and an unselected word line in the selected memory block, and a third reliability verification read operation on memory cells associated with the upper word line of the selected word line and the selected string selection line in the selected memory block, and wherein the controller counts a number of memory cells, each corresponding to at least one state of an erase state and program states of the unselected memory cells based on a result of at least one of the first, the second and the third reliability verification read operations.

13. The storage device of claim 12, further comprising a random access memory controlled by the controller, wherein the storage device forms a Solid State Drive.

14. The storage device of claim 13, wherein the controller stores data read from the nonvolatile memory device after the read operation into the random access memory.

15. The storage device of claim 14, wherein the controller output the data stored in the random access memory to the external device.

16. The storage device of claim 13, wherein the controller stores data read from the nonvolatile memory device during the first through third reliability verification read operations into the random access memory.

17. The storage device of claim 16, wherein the controller does not output the data stored in the random access memory to the external device.

18. The storage device of claim 16, wherein the controller calculates a difference between the number of memory cells and a reference count value based on the data stored in the random access memory.

19. The storage device of claim 18, wherein the controller receives write data for memory cells corresponding to a string selection line and a wordline, stores the write data into the random access memory and calculates the reference count value for the memory cells corresponding to the string selection line and the wordline based on the write data stored in the random access memory.

20. The storage device of claim 19, wherein the controller writes the write data stored in the random access memory into the memory cells corresponding to the string selection line and the wordline in the nonvolatile memory device after calculating the reference count value.

\* \* \* \* \*